United States Patent
Yokoi

(10) Patent No.: US 8,939,543 B2
(45) Date of Patent: Jan. 27, 2015

(54) INKJET INK COMPOSITION AND INKJET RECORDING METHOD

(71) Applicant: FUJIFILM Corporation, Minato-ku, Tokyo (JP)

(72) Inventor: Kazuhiro Yokoi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/221,524

(22) Filed: Mar. 21, 2014

(65) Prior Publication Data
US 2014/0204149 A1 Jul. 24, 2014

Related U.S. Application Data

(63) Continuation of application No. PCT/JP2012/006169, filed on Sep. 27, 2012.

(30) Foreign Application Priority Data

Sep. 29, 2011 (JP) ................. 2011-215037

(51) Int. Cl.
| | | |
|---|---|---|
| B41J 29/38 | (2006.01) | |
| B41J 2/195 | (2006.01) | |
| B41J 2/015 | (2006.01) | |
| B41J 2/17 | (2006.01) | |
| C09D 11/30 | (2014.01) | |
| C09D 11/101 | (2014.01) | |
| C09D 11/322 | (2014.01) | |

(52) U.S. Cl.
CPC ............. C09D 11/30 (2013.01); C09D 11/101 (2013.01); C09D 11/322 (2013.01)
USPC .......................... 347/20; 347/6; 347/7; 347/95

(58) Field of Classification Search
USPC .............................. 347/6–7, 20, 95
See application file for complete search history.

(56) References Cited

U.S. PATENT DOCUMENTS

| | | | |
|---|---|---|---|
| 2009/0046134 A1 | 2/2009 | Belelie et al. | |
| 2009/0110827 A1* | 4/2009 | Nakano et al. | 427/256 |
| 2012/0229583 A1* | 9/2012 | Fukumoto et al. | 347/102 |

FOREIGN PATENT DOCUMENTS

| | | |
|---|---|---|
| JP | 2007-99830 A | 4/2007 |
| JP | 2007-262177 A | 10/2007 |
| JP | 2007-314632 A | 12/2007 |
| JP | 2009-235121 A | 10/2009 |
| WO | 00/37168 A1 | 6/2000 |

OTHER PUBLICATIONS

International Search Report [PCT/ISA/210], Jun. 26, 2013.

* cited by examiner

Primary Examiner — Jason Uhlenhake
(74) Attorney, Agent, or Firm — Sughrue Mion, PLLC

(57) ABSTRACT

To provide an inkjet ink composition that has excellent discharge stability and gives an ink image film having excellent substrate adhesion and film hardness, and an inkjet recording method employing the inkjet ink composition.
An inkjet ink composition comprises (Component A) a dendritic polymer compound having a weight-average molecular weight of 3,000 to 100,000 and having a constituent repeating unit represented by Formula (I); (Component B) a polymerization initiator; and (Component C) a radically polymerizable compound.

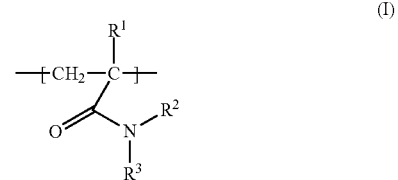

(In Formula (I), $R^1$ and $R^2$ independently denote a hydrogen atom or an alkyl group having 1 to 6 carbons, $R^3$ denotes an alkyl group having 1 to 12 carbons, and $R^2$ and $R^3$ may be bonded to form a ring structure.)

17 Claims, No Drawings

INKJET INK COMPOSITION AND INKJET RECORDING METHOD

CROSS-REFERENCE TO RELATED APPLICATION

The present application is a continuation application of International Application No. PCT/JP2012/006169, filed Sep. 27, 2012, which claims priority to Japanese Patent Application No. 2011-215037 filed on Sep. 29, 2011. The contents of these applications are incorporated herein by reference in their entirety.

TECHNICAL FIELD

The present invention relates to an inkjet ink composition and an inkjet recording method.

BACKGROUND ART

As image recording methods for forming an image on a recording medium such as paper based on an image data signal, there are an electrophotographic method, sublimation type and melt type thermal transfer methods, an inkjet method, etc. Among them, since the inkjet method can be carried out by inexpensive equipment and carries out image formation directly on a recording medium by discharging an ink only in a required image area, use of the ink is efficient and the running cost is low.

As an ink composition used in such a recording method, for example, ink compositions described in Patent Documents 1 to 4 have been proposed.

PRIOR ART DOCUMENTS

Patent Documents

Patent Document 1: JP-A-2009-235121 (JP-A denotes a Japanese unexamined patent application publication)
Patent Document 2: JP-A-2007-262177
Patent Document 3: JP-A-2007-314632
Patent Document 4: JP-A-2007-99830

SUMMARY OF THE INVENTION

Problems to be Solved by the Invention

When printing is carried out by an inkjet method, in the case of producing a molded article (e.g. a dummy can, blister pack, etc.) of a plastic printed material, there is a desire for substrate adhesion of an obtained image to a recording medium such as a plastic substrate.

However, with regard to the technique of Patent Document 1, there is still room for improvement in terms of substrate adhesion of an obtained film. There is also room for improvement in terms of film hardness and ink composition discharge stability.

It is an object of the present invention to provide an inkjet ink composition that has excellent discharge stability and gives an ink image film having excellent substrate adhesion and film hardness, and an inkjet recording method employing the inkjet ink composition.

Means for Solving the Problems

The object of the present invention has been attained by means <1> and <17> below, which are described together with <2> to <16>, which are preferred embodiments.
<1> An inkjet ink composition comprising (Component A) a dendritic polymer compound having a weight-average molecular weight of 3,000 to 100,000 and having a constituent repeating unit represented by Formula (I), (Component B) a polymerization initiator, and (Component C) a radically polymerizable compound,

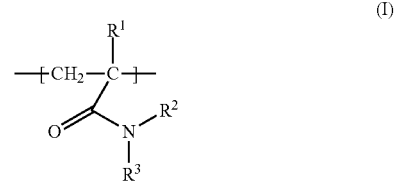

(I)

wherein $R^1$ and $R^2$ independently denote a hydrogen atom or an alkyl group having 1 to 6 carbons, $R^3$ denotes an alkyl group having 1 to 12 carbons, and $R^2$ and $R^3$ may be bonded to form a ring structure,
<2> the inkjet ink composition according to <1> above, wherein Component C comprises (Component C-1) a monofunctional radically polymerizable compound,
<3> the inkjet ink composition according to <2> above, wherein the content of Component C-1 is at least 80 wt % of the total weight of Component C,
<4> the inkjet ink composition according to <2> or <3> above, wherein the content of Component C-1 is at least 85 wt % of the total weight of Component C,
<5> the inkjet ink composition according to any one of <1> to <4> above, wherein Component C comprises a difunctional radically polymerizable compound,
<6> the inkjet ink composition according to any one of <1> to <5> above, wherein Component A has a weight-average molecular weight of 3,000 to 60,000,
<7> the inkjet ink composition according to any one of <1> to <6> above, wherein Component A comprises a polyfunctional thiol compound residue,
<8> the inkjet ink composition according to any one of <1> to <7> above, wherein Component A comprises a tetra- or higher-valent polyfunctional thiol compound residue,
<9> the inkjet ink composition according to any one of <1> to <8> above, wherein Component A has a molecular weight distribution (weight-average molecular weight (Mw)/number-average molecular weight (Mn)) of no greater than 3,
<10> the inkjet ink composition according to any one of <1> to <9> above, wherein it further comprises (Component D) a colorant,
<11> the inkjet ink composition according to any one of <1> to <10> above, wherein Component C comprises (Component C-2) an N-vinyl compound,
<12> the inkjet ink composition according to <11> above, wherein Component C-2 is N-vinylcaprolactam,
<13> the inkjet ink composition according to any one of <1> to <12> above, wherein Component A is a copolymer having a constituent repeating unit represented by Formula (I) above and a constituent repeating unit represented by Formula (II),

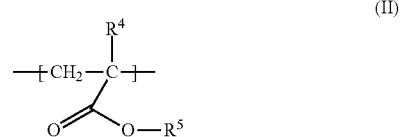

(II)

wherein $R^4$ denotes a hydrogen atom or an alkyl group having 1 to 6 carbons and $R^5$ denotes an optionally substituted alkyl group or an optionally substituted aryl group, <14> the inkjet ink composition according to any one of <1> to <13> above, wherein Component A is a copolymer having at least two different types of constituent repeating units represented by Formula (I) above,
<15> the inkjet ink composition according to any one of <1> to <14> above, wherein Component A is a star polymer,
<16> the inkjet ink composition according to any one of <1> to <15> above, wherein Component A is a star polymer having a polymer chain having a constituent repeating unit represented by Formula (I) as a branched structure, and
<17> an inkjet recording method comprising ($a^1$) a step of discharging the inkjet ink composition according to any one of <1> to <16> above onto a recording medium, and ($b^1$) a step of curing the inkjet ink composition by irradiating the discharged inkjet ink composition with actinic radiation.

MODE FOR CARRYING OUT THE INVENTION

The present invention is explained in detail below.
(Inkjet Ink Composition)
The inkjet ink composition of the present invention (hereinafter, also called an 'ink composition') comprises (Component A) a dendritic polymer compound having a weight-average molecular weight of 3,000 to 100,000 and having a constituent repeating unit represented by Formula (I), (Component B) a polymerization initiator, and (Component C) a radically polymerizable compound.

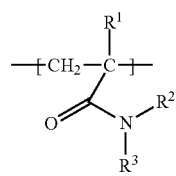
(I)

(In Formula (I), $R^1$ and $R^2$ independently denote a hydrogen atom or an alkyl group having 1 to 6 carbons, $R^3$ denotes an alkyl group having 1 to 12 carbons, and $R^2$ and $R^3$ may be bonded to form a ring structure.)

In the present invention, the notation 'A to B', which expresses a numerical range, has the same meaning as 'at least A but no greater than B'. Furthermore, '(Component A) a dendritic polymer compound having a weight-average molecular weight of 3,000 to 100,000 and having a constituent repeating unit represented by Formula (I)', etc. may be called simply 'Component A', etc.

In addition, in the present invention, '(meth)acrylic' is a term meaning either one of 'acrylic' and 'methacrylic' or both thereof, and '(meth)acrylate' is a term meaning either one of 'acrylate' and 'methacrylate' or both thereof.

The ink composition of the present invention is an oil-based ink composition that can be cured by actinic radiation (also called 'active energy radiation'). 'Actinic radiation' is radiation that can provide energy that enables an initiating species to be generated in the ink composition when irradiated, and includes α rays, γ rays, X rays, UV rays, visible light, an electron beam, etc. Among these, UV rays and an electron beam are preferable from the viewpoint of curing sensitivity and the availability of equipment, and UV rays are more preferable.
(Component A) Dendritic Polymer Compound Having Weight-Average Molecular Weight of 3,000 to 100,000 and Having Constituent Repeating Unit Represented by Formula (I)

The ink composition of the present invention comprises a dendritic polymer compound having a weight-average molecular weight of 3,000 to 100,000 and having a constituent repeating unit represented by Formula (I).

The 'dendritic' polymer compound contained in the ink composition of the present invention is now explained.

A dendritic polymer is also called a hyperbranched polymer; it is a general term for a polymer having branching, and is one kind of branched type polymer (also called a branching polymer or a branched polymer). It may be synthesized by a polymerization reaction using a polyfunctional chain transfer agent or a polyfunctional initiator or by a polyaddition reaction using a A-$B_2$ type monomer. A dendritic polymer can easily have introduced thereinto a branched structure showing different physical properties from those of a polymer having a straight chain structure.

It is surmised that, due to Component A being a dendritic polymer, when an ink film is cured the concentration of polyacrylamide in the vicinity of an interface and at the interface with air increases, the interfacial strength and the strength of the film surface improve, it becomes harder for the ink image film to undergo brittle fracture, and the substrate adhesion of the ink image film and the film hardness improve. Furthermore, although not definite, it is surmised that due to it being a dendritic polymer, compared with a straight chain polymer, since entanglement between polymers is suppressed, its influence on the dynamic surface tension of the ink is reduced, and an ink composition having excellent discharge stability is obtained.

The 'dendritic' polymer compound as Component A may be obtained by for example a method in which a 'comb type' polymer obtained by graft polymerization is further branched, and a method in which a polyfunctional chain transfer agent is added in a radical polymerization reaction involving a living reaction is also used preferably as means for obtaining a 'dendritic' polymer compound.

Component A is a polymer compound having a weight-average molecular weight of 3,000 to 100,000. Component A is preferably synthesized by a method in which a polyfunctional chain transfer agent is added to a living radical polymerization reaction in order to form a dendritic polymer, and since the molecular weight of a polymer formed by this means is relatively low, as a synthetic method for Component A a method in which a polyfunctional chain transfer agent is added to a living radical polymerization reaction is preferably used.

It is surmised that lowering the molecular weight so that it is in the above-mentioned range enables any increase in the viscosity of the ink composition to be suppressed, thus contributing to the discharge stability of the ink composition.

Furthermore, Component A preferably has a molecular weight distribution (weight-average molecular weight (Mw)/number-average molecular weight (Mn)) of no greater than 3. Use of a living radical polymerization reaction in the synthesis of Component A enables Component A to be controlled so as to have a relatively narrow molecular weight distribution. It is surmised that the molecular weight distribution of Component A being no greater than 3 contributes to improvement of the solubility of Component A in the ink composition.

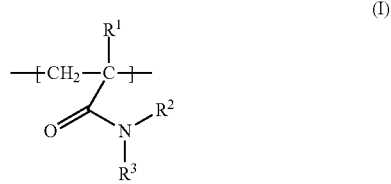
(I)

(In Formula (I), $R^1$ and $R^2$ independently denote a hydrogen atom or an alkyl group having 1 to 6 carbons, $R^3$ denotes an alkyl group having 1 to 12 carbons, and $R^2$ and $R^3$ may be bonded to form a ring structure.)

In Formula (I), $R^1$ denotes a hydrogen atom or an optionally substituted alkyl group having 1 to 6 carbons, the number of carbons being preferably 1 to 3, and more preferably 1. The substituent is preferably a halogen atom, a hydroxy group, an amino group, or an alkoxy group having 1 to 3 carbons. Preferred examples of the alkyl group include a methyl group, an ethyl group, an n-propyl group, an isopropyl group, an n-butyl group, an s-butyl group, a t-butyl group, an n-hexyl group, an isohexyl group, a hydroxymethyl group, a methoxymethyl group, and a methylcarbonyloxy group. $R^1$ is particularly preferably a hydrogen atom.

In Formula (I), $R^2$ denotes a hydrogen atom or an optionally substituted alkyl group having 1 to 6 carbons, the number of carbons being preferably 1 to 3, and more preferably 1 or 2. The substituent is preferably a halogen atom, a hydroxy group, an amino group, or an alkoxy group having 1 to 3 carbons. The alkyl group is preferably a methyl group, an ethyl group, an n-propyl group, an isopropyl group, an n-butyl group, a t-butyl group, an n-hexyl group, an isohexyl group, a hydroxymethyl group, a methoxymethyl group, or a methylcarbonyloxy group, and more preferably a methyl group or an ethyl group. Among these, $R^2$ is particularly preferably a hydrogen atom, a methyl group, or an ethyl group.

In Formula (I), $R^3$ denotes an optionally substituted alkyl group having 1 to 12 carbons, and it may be straight-chain, branched, or cyclic. Examples of the substituent include an aryl group, an alkoxy group, an aryloxy group, an aralkyloxy group, a halogen atom, an arylamino group, an amino group, a carbamoyl group, a hydroxy group, an acyloxy group, an alkoxycarbonyl group, an acylamino group, an imidazolyl group, a pyridyl group, an imidazolium group, a pyridinium group, and an ammonio group, and among these an aryl group, an alkoxy group, an acyloxy group, an imidazolyl group, and a pyridyl group are preferable. The number of carbons of the alkyl group is preferably 1 to 12, more preferably 1 to 10, and particularly preferably 1 to 8. Preferred specific examples of the alkyl group include a methyl group, an ethyl group, an n-propyl group, an isopropyl group, an n-butyl group, an s-butyl group, a t-butyl group, an n-hexyl group, an n-octyl group, a 2-ethylhexyl group, an n-decyl group, an n-dodecyl group, a benzyl group, a hydroxyethyl group, a hydroxybutyl group, a methoxyethyl group, an ethoxyethyl group, a 2-chloroethyl group, a 3-chloropropyl group, an acetoxyethyl group, an acetoxybutyl group, a phenyloxyethyl group, a phenyloxybutyl group, and a phenylethyloxyethyl group, and a methyl group, an ethyl group, an n-propyl group, an isopropyl group, an n-butyl group, an s-butyl group, a t-butyl group, an n-hexyl group, an n-octyl group, a 2-ethylhexyl group, an n-decyl group, and an n-dodecyl group are preferable. Among them, $R^3$ is particularly preferably a methyl group, an ethyl group, an n-butyl group, an n-butoxymethyl group, an isobutoxymethyl group, an s-butoxymethyl group, or an n-dodecyl group.

In Formula (I), $R^2$ and $R^3$ may be bonded to form a nitrogen atom-containing ring structure. As the ring structure, 5-membered to 7-membered rings are preferably cited, and a 6-membered ring is particularly preferable. Other than nitrogen and carbon atoms, the ring structure may contain an oxygen atom or a sulfur atom. Preferred examples of the ring structure include ring structures such as pyrrolidine, imidazolidine, pyrazolidine, piperidine, piperazine, and morpholine, and the morpholine ring structure is particularly preferable.

It is also preferable for Component A to be a copolymer having two different types of constituent repeating units represented by Formula (I).

The polymer compound having a constituent repeating unit represented by Formula (I) contained in the ink composition of the present invention preferably has a constituent repeating unit represented by Formula (I) and a constituent repeating unit represented by Formula (II).

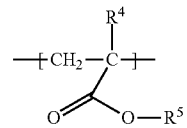

(In Formula (II), $R^4$ denotes a hydrogen atom or an alkyl group having 1 to 6 carbons, and $R^5$ denotes an optionally substituted alkyl group or an optionally substituted aryl group.)

In Formula (II), $R^4$ denotes a hydrogen atom or an optionally substituted alkyl group having 1 to 6 carbons, the number of carbons being preferably 1 to 3, and more preferably 1. The substituent is preferably a halogen atom, a hydroxy group, an amino group, or an alkoxy group having 1 to 3 carbons. Preferred examples of the alkyl group include a methyl group, an ethyl group, an n-propyl group, an isopropyl group, an n-butyl group, an s-butyl group, a t-butyl group, an n-hexyl group, an isohexyl group, a hydroxymethyl group, a methoxymethyl group, and a methylcarbonyloxy group. $R^4$ is particularly preferably a hydrogen atom or a methyl group.

In Formula (II), $R^5$ denotes an optionally substituted alkyl group or an optionally substituted aryl group. Examples of the substituent include an alkyl group, an aryl group, an alkoxy group, an aryloxy group, a halogen atom, an alkylamino group, an arylamino group, an amino group, a carbamoyl group, a hydroxy group, an acyloxy group, an alkoxycarbonyl group, an acylamino group, and a heterocyclic group, and among these an aryl group, an alkoxy group, an acyloxy group, and a heterocyclic group are preferable. The number of carbons of the alkyl group is preferably 1 to 32, more preferably 2 to 24, and particularly preferably 4 to 18. Preferred specific examples of the alkyl group include a methyl group, an ethyl group, an n-propyl group, an isopropyl group, an n-butyl group, a t-butyl group, an n-hexyl group, an n-octyl group, a 2-ethylhexyl group, an n-decyl group, an n-dodecyl group, an octadecyl group, a benzyl group, a hydroxyethyl group, a hydroxybutyl group, a methoxyethyl group, an ethoxyethyl group, a 2-chloroethyl group, a 3-chloropropyl group, an acetoxyethyl group, an acetoxybutyl group, a phenyloxyethyl group, a phenyloxybutyl group, and a phenylethyloxyethyl group, and an n-propyl group, an isopropyl group, an n-butyl group, a t-butyl group, an n-hexyl group, an n-octyl group, a 2-ethylhexyl group, an n-decyl group, and an n-dodecyl group are particularly preferable. The number of carbons of the aryl group is preferably 6 to 32, more preferably 6 to 24, and particularly preferably 6 to 18. Specific examples of the aryl group include a phenyl group, a naphthyl group, a 2-methoxyphenyl group, a 2-decyloxyphenyl group, 4-methoxyphenyl group, a 2-octyloxynaphthyl group, 4-dimethylaminophenyl group, a 2-dodecylthiophenyl group, a 4-(4-methylphenylthioxy)phenyl group, a 2-methoxy-4-dodecylthioxyphenyl group, a 2-phenoxyethoxyphenyl group, a 2-dodecyloxyphenyl group, a 2-octadecyloxyphenyl group, a 2,5-dibenzyloxyphenyl group, a 2,5-dicyclohexylmethyloxyphenyl group, a 2-methoxy-4-(2-ethylhexanoylamino)phenyl group, a 2-butoxy-4-benzyloxycarbonylaminophenyl group, and a 2-octyloxy-4-butyloxycarbonylaminophenyl group.

The polymer compound having a constituent repeating unit represented by Formula (I) contained in the ink composition of the present invention may be a copolymer comprising, in addition to a constituent repeating unit represented by Formula (I) and a constituent repeating unit represented by Formula (II), a constituent repeating unit derived from another copolymerizable monomer. Examples of the other copolymerizable monomer include an aromatic vinyl (styrene, vinyltoluene, α-methylstyrene, vinylpyridine, N-vinylimidazole, etc.), a vinyl ester (vinyl acetate, vinyl propionate, vinyl versatate, etc.), an aryl ester (aryl acetate, etc.), a halogen-containing monomer (vinylidene chloride, vinyl chloride, etc.), a vinyl cyanide ((meth)acrylonitrile, etc.), and an olefin (ethylene, propylene, etc.).

The molecular weight of Component A is 3,000 to 100,000 as a weight-average molecular weight, preferably 5,000 to 80,000, and particularly preferably 10,000 to 50,000. When the molecular weight is less than 3,000, the curability is insufficient, and when the molecular weight is 100,000 or greater, viscosity suitability is poor, and there might be a problem with discharge stability in an inkjet method. It is surmised that when the weight-average molecular weight of Component A is in the range of 3,000 to 100,000, the dynamic viscosity at discharge frequency is improved.

The weight-average molecular weight of Component A may be measured by gel permeation chromatography on a polystyrene basis.

(Method for Introducing Dendritic Structure)

Since Component A used in the ink composition of the present invention is a dendritic polymer, as synthetic means therefor, a method involving a radical polymerization reaction with an added polyfunctional initiator or polyfunctional chain transfer agent is preferably used. Furthermore, a more preferred Component A may be obtained by employing a living radical polymerization reaction. The chain transfer agent is not particularly limited as long as it is a compound having a group (hereinafter, also called a chain transferring group) that transfers an active site of a reaction by a chain transfer reaction in a polymerization reaction. In particular, the polyfunctional chain transfer agent is preferably a compound having a plurality of chain transferring groups per molecule since the effect is higher. Furthermore, as the chain transfer agent, there are a halogen compound, an alcohol, a sulfur compound, etc., and a thiol compound is more preferable. With regard to Component A used in the present invention, in a polymerization reaction therefor, a polyfunctional thiol compound having 3 or more thiol groups is more preferably used as a polyfunctional chain transfer agent.

The polyfunctional thiol compound is explained below.

(Polyfunctional Thiol Compound)

Component A used the ink composition of the present invention preferably contains a polyfunctional thiol compound residue.

A thiol compound is a compound generally known as a chain transfer agent compound whose thiol group functions as a chain transfer agent. The chain transfer agent is not particularly limited as long as it is a material that can transfer an active site of a reaction by a chain transfer reaction in a polymerization reaction. As the chain transfer agent, a thiol compound is preferably used, and with regard to Component A used in the present invention, a polyfunctional thiol compound having 3 or more thiol groups per molecule is more preferably used as a chain transfer agent in the polymerization reaction.

As the polyfunctional thiol compound for introducing into Component A a polyfunctional thiol compound residue that is to be contained in Component A used in the ink composition of the present invention, a thiol compound containing a mercapto group, represented by Formula (a) below, is preferable.

Hereinafter, a compound of Formula (a) is also called a 'polyfunctional thiol compound'.

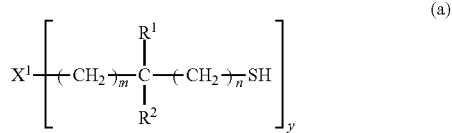

(a)

In Formula (a), $R^1$ and $R^2$ independently denote a hydrogen atom or an alkyl group having 1 to 10 carbons, m is an integer of 0 to 2, n is 0 or 1, y denotes an integer of 3 or greater, and $X^1$ is a y-valent organic residue.

$R^1$ is a hydrogen atom or an alkyl group having 1 to 10 carbons, and $R^2$ is preferably a hydrogen atom.

With regard to the polyfunctional thiol compound used in the present invention, as represented by Formula (a), the mercapto group-containing group may be bonded to the organic residue $X^1$ in any manner, but as represented by Formula (b) below, the mercapto-containing group is preferably bonded to an organic residue via a carboxylic acid ester residue.

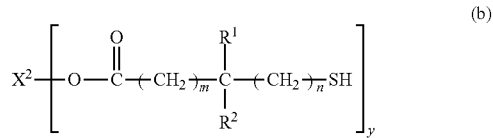

(b)

In the Formula, $R^1$ and $R^2$ independently denote a hydrogen atom or an alkyl group having 1 to 10 carbons, m is an integer of 0 to 2, n is 0 or 1, y denotes an integer of 3 or greater, and $X^2$ is a y-valent organic residue.

$R^1$ is a hydrogen atom or an alkyl group having 1 to 10 carbons, and $R^2$ is preferably a hydrogen atom.

In Formula (b), n is preferably 0, and m is preferably 0 or 1, and more preferably 1.

That is, the mercapto group is preferably a primary or secondary mercapto group, and more preferably a primary mercapto group. Furthermore, the polyfunctional thiol compound preferably has four or more mercapto group-containing groups (y is an integer of 4 or greater) rather than 3 (y=3). The plurality of mercapto group-containing groups present in one molecule may be all the same or different from each other.

In Formula (a) or Formula (b), the alkyl group denoted by $R^1$ or $R^2$ preferably has 1 to 5 carbons, and more preferably 1 to 3, and is particularly preferably a methyl group.

Examples of the organic residue (parent nucleus) $X^1$ or $X^2$ in the polyfunctional thiol compound include an aliphatic group, an aromatic group, a heterocyclic group, and a group formed by combining the above, all of which may have a substituent. The aliphatic group, the aromatic group, or the heterocyclic group may be bonded via a single bond or a divalent linking group selected from the group consisting of —O—, —S—, —CO—, —NH—, —SO$_2$—, —SO—, and a group formed by combining the above.

The chemical structure of the above-mentioned organic residue (parent nucleus) is described in detail below.

The number of carbons of the aliphatic group is preferably 1 to 60, more preferably 1 to 30, yet more preferably 1 to 20, and most preferably 1 to 10. The aliphatic group may have a double bond or a triple bond. The aliphatic group may have a cyclic structure or a branch.

The aromatic group preferably comprises a benzene ring or a naphthalene ring, and more preferably a benzene ring.

The heterocyclic group preferably has a 3- to 10-membered heterocycle, more preferably has a 4- to 8-membered hetero ring, and most preferably has a 5-membered or 6-membered heterocycle. The heteroatom of the heterocycle is preferably a nitrogen atom, an oxygen atom, or a sulfur atom. The heterocycle may be fused or spirobonded with an aliphatic ring, an aromatic ring, or another heterocycle. Examples of the heterocycle include a pyrrolidine ring, a piperidine ring, a piperazine ring, a morpholine ring, a tetrahydrofuran ring, a tetrahydropyran ring, a tetrahydrothiophene ring, a dioxane ring, an oxazole ring, a thiazole ring, a pyridine ring, a pyrazine ring, a triazine ring, a furan ring, a thiophene ring, and an isocyanurate ring. Among these, an isocyanurate ring is most preferable.

Examples of the substituent for the aliphatic group, the aromatic group, and the heterocyclic group include a hydroxy group, a halogen atom (e.g. a chlorine atom), a cyano group, an amino group, a substituted amino group, a heterocyclic group, an acyl group, and an acyloxy group. The substituent for the substituted amino group is preferably an alkyl group or an aryl group. The aromatic group and the heterocyclic group may have an alkyl group as a substituent.

As the above-mentioned substituent, a mercapto group or a group containing one is not included.

Preferred specific examples of $X^1$ or $X^2$, which is the parent nucleus of the polyfunctional thiol compound, are shown below, but the present invention is not limited thereto. The position at which the mercapto-containing group is bonded to the parent nucleus (including a mercapto-containing group via a carboxylic acid ester as in Formula (b)) is denoted by *.

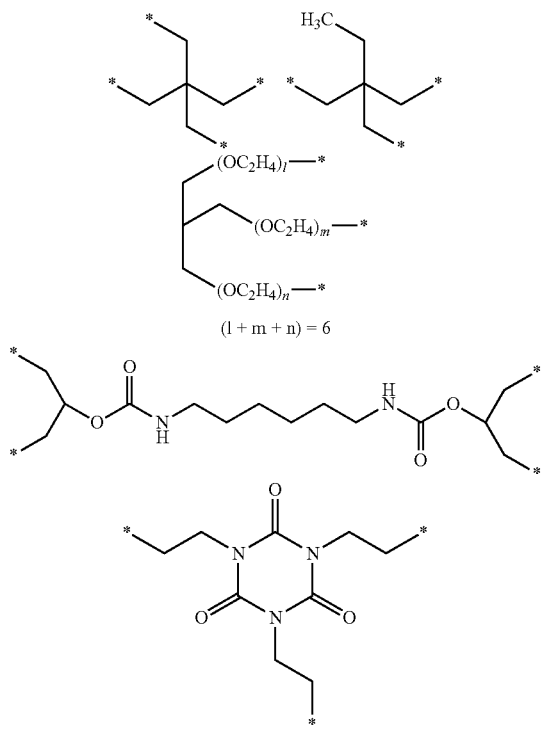

The organic residue of the polyfunctional thiol compound may contain a structural unit obtained by addition polymerization or polycondensation, and examples thereof include an oligovinyl group or a polyvinyl group. The polyfunctional thiol compound is preferably a low molecular weight molecule having a molecular weight of no greater than 10,000. Details are described later.

Specific examples of the polyfunctional thiol compound used in the synthesis of Component A used in the present invention include, but are not limited to, those cited below.

Examples include a compound having three mercapto groups such as 1,2,6-hexanetriol trithioglycolate, 1,3,5-trithiocyanuric acid, trimethylolpropane tris(3-mercaptopropionate), or trimethylolpropane tristhioglycolate, and a compound having four or more mercapto groups such as pentaerythritol tetrakis(3-mercaptopropionate), pentaerythritol tetrakisthioglycolate, pentaerythritol hexakis(3-mercaptopropionate), or pentaerythritol hexakisthioglycolate. As commercially available products of these polyfunctional thiol compounds, there are trimethylolpropane tris(3-mercaptopropionate), pentaerythritol tetrakis(3-mercaptopropionate), and pentaerythritol tetrakisthioglycolate (all manufactured by Yodo Kagaku Co., Ltd.).

Other than the above-mentioned compound examples, compounds described in paragraphs 0033 to 0035 of JP-A-2009-262370 may also be used in the present invention.

These compounds include trifunctional thiol compounds having 3 functional groups such as 1,3,5-tris(3-mercaptobutyloxyethyl)-1,3,5-triazine-2,4,6(1H,3H,5H)-trione, trimethylolpropane tristhiopropionate, tri hydroxyethyltriisocyanurate tristhiopropionate, and tris[(3-mercaptopropionyloxy)ethyl]isocyanurate, and 4 or more functional thiol compounds such as pentaerythritol tetrakis(3-mercaptobutyrate) and dipentaerythritol hexakis(3-mercaptopropionate).

Commercially available products of these polyfunctional thiol compounds (Formula (b)) include pentaerythritol tetrakis(3-mercaptobutyrate) (Karenz MTPE1) (trademark) and 1,3,5-tris(3-mercaptobutyloxyethyl)-1,3,5-triazine-2,4,6 (1H,3H,5H)-trione (Karenz MTNR1) (trademark) (both manufactured by Showa Denko K.K.), and trimethylolpropane tris(3-mercaptopropionate) (TMMP) (trademark), pentaerythritol tetrakis(3-mercaptopropionate) (PEMP) (trademark), dipentaerythritol hexakis(3-mercaptopropionate) (DPMP) (trademark), and tris[(3-mercaptopropionyloxy)ethyl]isocyanurate (TEMPIC) (trademark) (all manufactured by Sakai Chemical Industry Co., Ltd.).

As commercially available products, the Karenz MT series (Showa Denko K.K.) are suitably used.

Among the above-mentioned polyfunctional thiol compounds, since one having a large number of mercapto groups in one molecule exhibits a large effect with a small amount thereof added, a polyfunctional thiol compound having 3 or more mercapto groups per molecule is preferable, and a polyfunctional thiol compound having 4 or more mercapto groups, that is, a tetra- or higher-valent thiol compound, is more preferable.

Furthermore, a polyfunctional thiol compound having a carboxylic acid ester bond is preferable. As a polyfunctional thiol compound having an ester bond, an ester between thioglycolic acid, 3-mercaptobutyric acid, or 3-mercaptopropionic acid and a polyhydric alcohol is preferable.

Specific preferred examples of the compound include trimethylolpropane tris(3-mercaptopropionate), pentaerythritol tetrakis(3-mercaptopropionate), and 1,3,5-tris(3-mercaptobutyryloxyethyl)-1,3,5-triazine-2,4,6(1H,3H,5H)-trione.

Specific preferred examples are shown below using their chemical structural formulae.

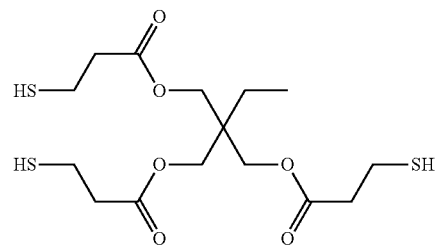

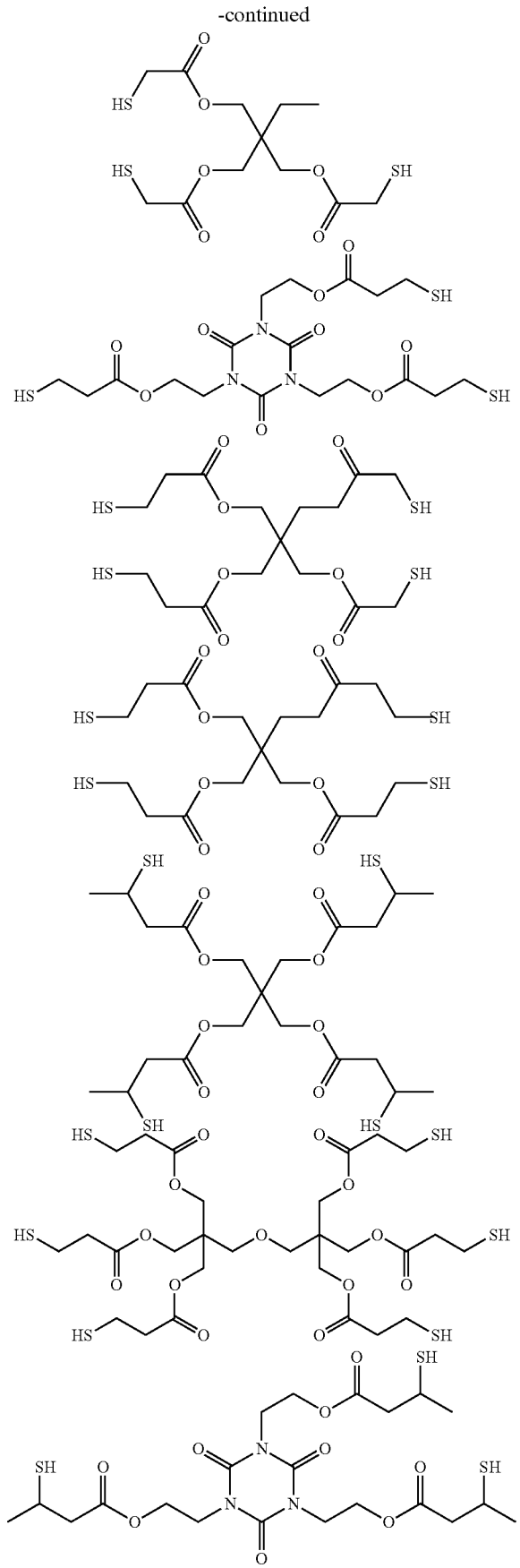

The molecular weight of the polyfunctional thiol compound is not particularly limited, but is preferably 100 to 10,000, more preferably 200 to 5,000, and particularly preferably 200 to 1,000.

With regard to the polyfunctional thiol compound, only one type thereof may be used, or two or more types thereof may be used in combination.

The amount of polyfunctional thiol compound used in the synthesis of Component A may be selected appropriately according to the purpose of Component A, but it is preferably 0.01 to 20 mole % relative to 100 mole % of polymerizable compounds used in polymerization for Component A, more preferably 0.1 to 10 mole %, and yet more preferably 0.1 to 5 mole %.

As a synthetic method for Component A, various existing methods may be used, and examples thereof include a method mainly using a polyfunctional chain transfer agent, a method in which a chain transfer agent such as the above-mentioned polyfunctional thiol compound is added as a polyfunctional initiator to a free radical polymerization system, and a method involving living radical polymerization such as atom transfer radical polymerization using a polyfunctional initiator or RAFT polymerization (Reversible Addition Fragmentation Chain Transfer polymerization reaction). A synthetic method for a branched polymer involving living radical polymerization may employ a method described in Chem. Rev., 2009, 109, 4963 to 5050 or Polymer, 2008, 49, 1079 to 1131.

Preferred examples of the synthetic method for Component A involving atom transfer radical polymerization (ATRP) using a polyfunctional initiator include a method in which a polyfunctional alkyl halide initiator is polymerized as a core compound. Specific preferred examples include a method in which a copper catalyst is used as a polyfunctional alkyl halide initiator and a radically polymerizable compound such as a (meth)acrylamide compound forming a constituent repeating unit represented by Formula (I) is polymerized.

Preferred examples of the copper catalyst include a monovalent copper catalyst having a polyfunctional amine, such as tris[2-(dimethylamino)ethyl]amine ($Me_6$-TREN) or tris(2-pyridylmethyl)amine (TPMA), as a ligand.

The polyfunctional alkyl halide initiator is preferably a tri- or higher-functional alkyl halide initiator and more preferably a tri- to hexa-functional alkyl halide initiator, the compounds shown below being particularly preferable. Furthermore, the halogen atom of the polyfunctional alkyl halide initiator is preferably a bromine atom from the viewpoint of stability, ease of synthesis, and reactivity, and is preferably a halogen atom bonded to a secondary or tertiary carbon atom.

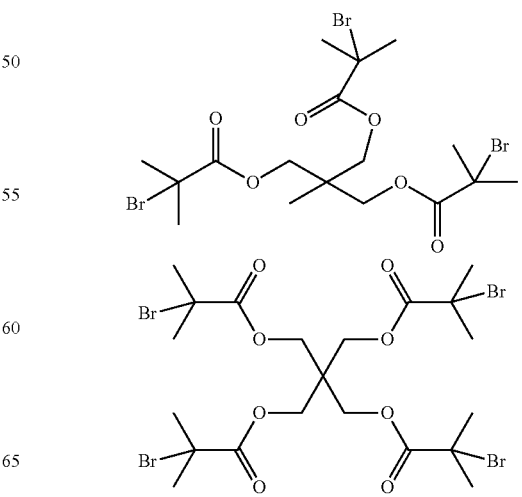

-continued

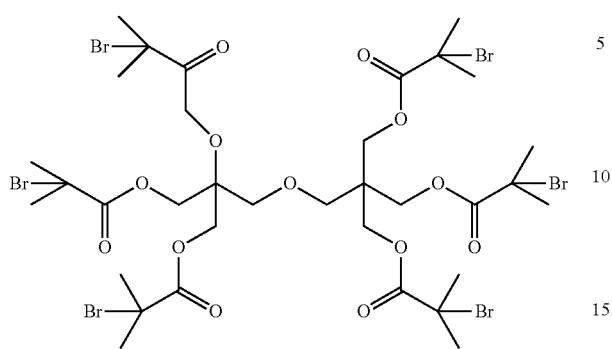

Furthermore, Component A is preferably a hyper brunched polymer, and more preferably a hyper brunched polymer having a polymer chain having a constituent repeating unit represented by Formula (I) as a structure of a branch.

Specific examples of Component A used in the ink composition of the present invention include the compounds below. The * symbol in the structure of a core of branches denotes a portion linked to a structure of a branch, Mw denotes the weight-average molecular weight, and Mw/Mn denotes the molecular weight distribution.

Polymer A-1

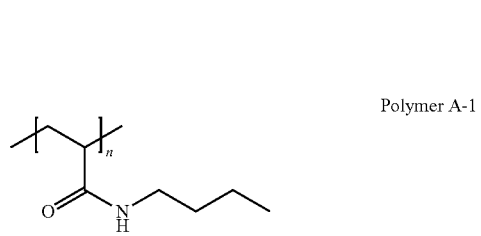

Structure of
Branch
Mw = 10,000
Mw/Mn = 2.3

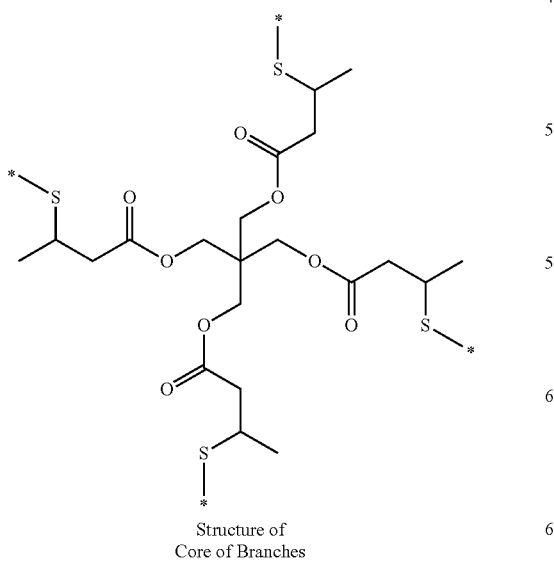

Structure of
Core of Branches

-continued

Polymer A-2

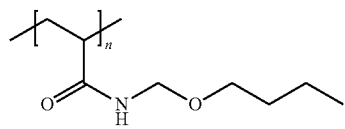

Structure of
Branch
Mw = 18,000
Mw/Mn = 2.7

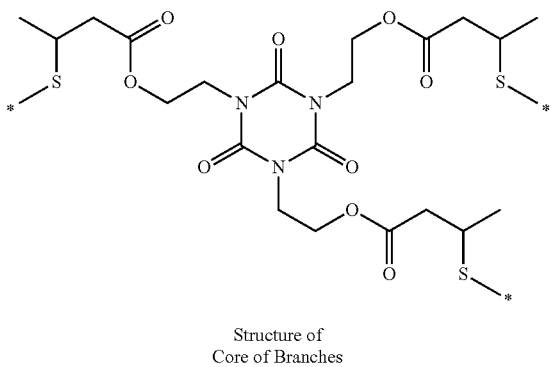

Structure of
Core of Branches

Polymer A-3

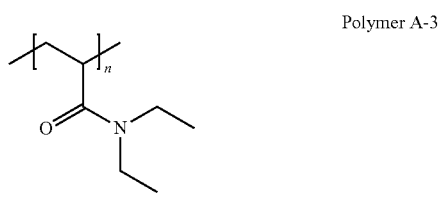

Structure of
Branch
Mw = 12,000
Mw/Mn = 2.1

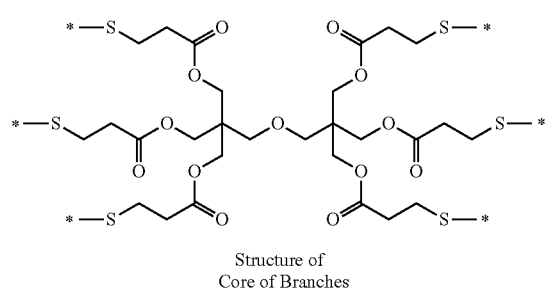

Structure of
Core of Branches

Polymer A-4

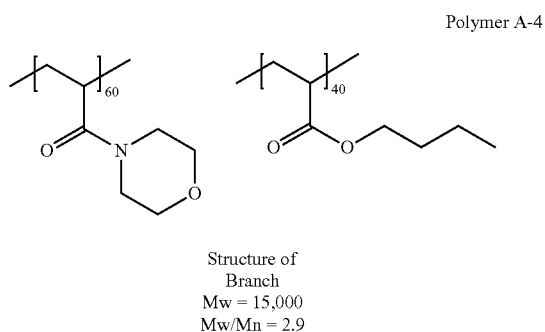

Structure of
Branch
Mw = 15,000
Mw/Mn = 2.9

-continued

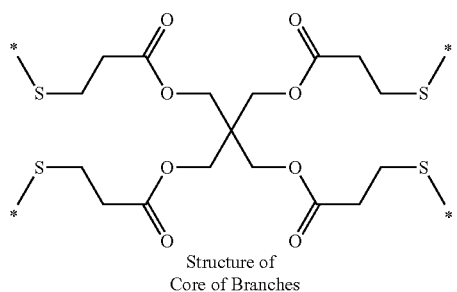

Structure of
Core of Branches

Polymer A-5

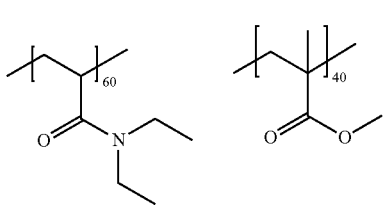

Structure of
Branch
Mw = 22,000
Mw/Mn = 1.4

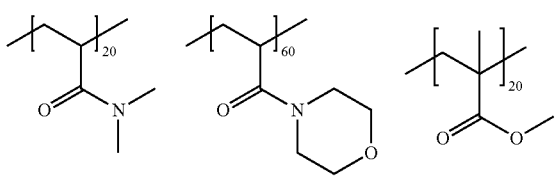

Structure of
Core of Branches

Polymer A-6

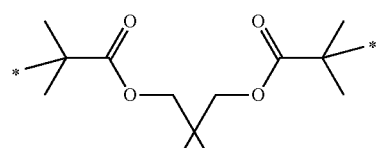

Structure of
Branch
Mw = 42,000
Mw/Mw = 1.8

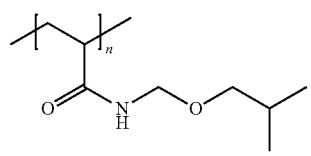

-continued

Polymer A-7

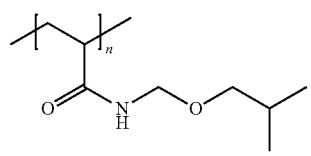

Structure of
Branch
Mw = 24,000
Mw/Mw = 1.5

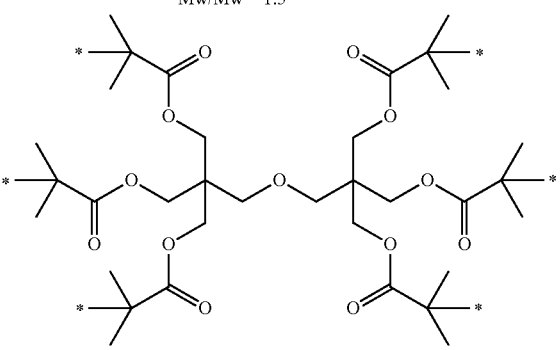

Structure of
Core of Branches

Polymer A-8

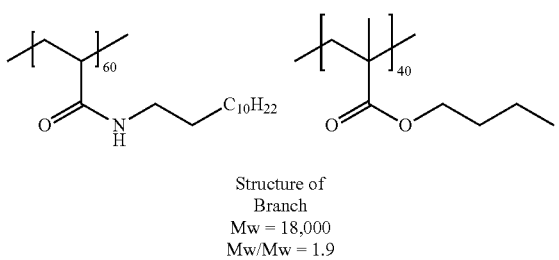

Structure of
Branch
Mw = 18,000
Mw/Mw = 1.9

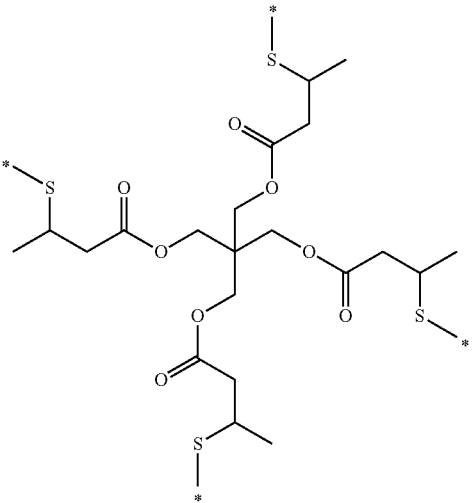

Structure of
Core of Branches

With regard to Component A, one type thereof may be used on its own or two or more types thereof may be used in combination.

The content of Component A in the ink composition of the present invention is preferably 0.1 to 20 wt % relative to the total weight of the ink composition, more preferably 0.2 to 15 wt %, yet more preferably 0.5 to 10 wt %, and particularly preferably 1 to 10 wt %. When in the above-mentioned range, the substrate adhesion and the discharge stability are excellent.

(Component B) Polymerization Initiator

The ink composition of the present invention comprises a polymerization initiator. As a polymerization initiator that can be used in the present invention, a thermal polymerization initiator and a photopolymerization initiator are used respectively, and it is preferable to use a photopolymerization initiator. As a photopolymerization initiator that can be used in the present invention, a known photopolymerization initiator may be used to select appropriately according to a kind of a polymerizable compound and the intended purpose of the ink composition.

The photopolymerization initiator that can be used in the ink composition of the present invention is a compound that forms a polymerization initiating species by absorbing external energy (light). The light used for initiating polymerization denotes an actinic radiation, that is, α rays, γ rays, an electron beam, ultraviolet rays, visible light, infrared rays, etc., and ultraviolet rays is preferable.

It is preferable to use a radical polymerization initiator as a polymerization initiator.

Examples of the photopolymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound.

With regard to these radical polymerization initiators, the above-mentioned compounds (a) to (m) may be used singly or in combination. The photopolymerization initiator in the present invention may suitably be used singly or in a combination of two or more types.

Preferred examples of the aromatic ketone (a), the acylphosphine compound (b) and the thio compound (e) include a compound having a benzophenone skeleton (benzophenone compound) or a compound having a thioxanthone skeleton (thioxanthone compound) described in 'RADIATION CURING IN POLYMER SCIENCE AND TECHNOLOGY' J. P. FOUASSIER and J. F. RABEK (1993), pp. 77 to 117. Preferred examples include an α-thiobenzophenone compound described in JP-B-47-6416, a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561A1, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, a thioxanthone described in JP-B-63-61950, and a coumarin described in JP-B-59-42864. Moreover, preferred examples include a compound described in JP-A-2008-105379 and JP-A-2009-114290.

Among them, in the present invention, it is preferable to use as a photopolymerization initiator an aromatic ketone and/or an acylphosphine oxide compound, and it is more preferable to use an aromatic ketone and an acylphosphine oxide compound. Specifically, for example, it is preferable to use p-phenylbenzophenone (commercially available from for example Wako Pure Chemical Industries, Ltd.) or bis(2,4,6-trimethylbenzoyl)phenylphosphine oxide (commercially available from for example BASF as Irgacure 819), or bis(2,6-dimethoxybenzoyl)-2,4,4-trimethylpentylphenylphosphine oxide or 2,4,6-trimethylbenzoyldiphenylphosphine oxide (commercially available from for example BASF as Darocur TPO or Lucirin TPO), it is more preferable to use at least p-phenylbenzophenone, and it is particularly preferable to use p-phenylbenzophenone and 2,4,6-trimethylbenzoyldiphenylphosphine oxide.

The polymerization initiator can be used singly or in a combination of two or more types.

In the ink composition of the present invention, the total amount of polymerization initiator used is preferably 0.1 to 20 wt % relative to the total amount of polymerizable compound, including an N-vinyllactam, used, more preferably 0.5 to 15 wt %, and yet more preferably 1 to 10 wt %.

(Component C) Radically Polymerizable Compound

The ink composition of the present invention comprises a radically polymerizable compound.

The radically polymerizable compound contained in the ink composition of the present invention is not limited as long as it is a compound having a polymerizable unsaturated bond, but is preferably a polymerizable monomer having a radically polymerizable ethylenically unsaturated bond.

The content of Component C in the ink composition of the present invention is preferably 0.30 to 95 wt % relative to the total weight of the ink composition, more preferably 40 to 90 wt %, yet more preferably 45 to 80 wt %, and particularly preferably 50 to 75 wt %. When in the above-mentioned range, the substrate adhesion and the discharge stability are better.

Furthermore, it is preferable for one having one ethylenically unsaturated bond per molecule, that is, (Component C-1) a monofunctional radically polymerizable compound, to be contained.

In the ink composition of the present invention, Component C-1 is preferably contained in an amount of at least 80 wt % of the total weight of Component C, more preferably at least 85 wt %, and particularly preferably 91 to 100 wt %. When Component C-1 is contained in an amount of at least 85 wt % of the total weight of Component C, an ink composition giving excellent stretchability is obtained. Furthermore, when it is contained in an amount of at least 91 wt %, an ink composition also having excellent adhesion is obtained.

Moreover, it is preferable for the ink composition of the present invention not to contain a tri- or higher-functional polyfunctional radically polymerizable compound as Component C.

With regard to Component C-1, one type thereof may be used on its own or two or more types thereof may be used in combination.

Specific examples of a radically polymerizable compound having a radically polymerizable ethylenically unsaturated bond include nitrogen-containing radically polymerizable compounds such as a N-vinyl compound, acrylamide, and methacrylamide; unsaturated carboxylic acids such as acrylic acid, methacrylic acid, itaconic acid, crotonoic acid, isocrotonoic acid, and maleic acid, and salts thereof; anhydrides having an ethylenically unsaturated group; acrylonitrile; styrene. Moreover, examples of a radically polymerizable compound having a radically polymerizable ethylenically unsaturated bond include various types of radically polymerizable compounds such as unsaturated polyesters, unsaturated polyethers, unsaturated polyamides, and unsaturated urethanes.

Specific examples of Component C-1 include N-vinyl compounds such as a N-vinyl lactam, a N-vinyl formamide; amide compounds such as acrylamide, N-methylolacrylamide, diacetoneacrylamide, N,N-dimethylacrylamide, N,N-diethylacrylamide, N-isopropylacrylamide, acryloyl morpholine, methacrylamide, N-methylolmethacrylamide, diacetonemethacrylamide, N,N-di methyl methacrylamide, N,N-diethylmethacrylamide, N-isopropylmethacrylamide, methacryloyl morpholine; acrylates such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, epoxy acrylate, isobornyl acrylate, dicyclopentenyl acrylate, dicyclopentenyloxyethyl acrylate, dicyclopentanyl acrylate, 2-hydroxy-3-phenoxypropyl acrylate, 2-acryloyloxyethylphthalic acid, methoxypolyethylene glycol acrylate, 2-acryloyloxyethyl-2-hydroxyethylphthalic acid, cyclictrimethylolpropane formal acrylate, 2-(2-ethoxyethoxy)ethyl acrylate, 2-methoxyethyl acrylate, 3-methoxybutyl acrylate, ethoxylated phenyl acrylate, 2-acryloyloxyethylsuccinic acid, acrylate of nonylphenol EO adducts, phenoxypolyetylene glycol acrylate, 2-acryloyloxyethylhexahydrophthalic acid, lactone modified acrylate, stearyl acrylate, isoamyl acrylate, isomyristyl acrylate, and isostearyl acrylate; methacrylates such as methyl methacrylate, n-butyl methacrylate, allyl methacrylate, glycidyl methacrylate, benzyl methacrylate, and dimethylaminomethyl methacrylate; and allyl compound derivatives such as allyl glycidyl ether; vinyl ether compounds such as methyl vinyl ether, ethyl vinyl ether, n-propyl vinyl ether, isopropyl vinyl ether, n-butyl vinyl ether, isobutyl vinyl ether, t-butyl vinyl ether, n-octadecyl vinyl ether, 2-ethylhexyl vinyl ether, n-nonyl vinyl ether, dodecyl vinyl ether, octadecyl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, phenoxypolyethylene glycol vinyl ether, cyclohexanedimethanol monovinyl ether, and isopropenyl vinyl ether.

Component C used in the ink composition of the present invention preferably comprises (Component C-2) an N-vinyl compound.

Preferred examples of the N-vinyl compound that can be used in the present invention include an N-vinyllactam.

As an N-vinyllactam, a compound represented by Formula (c) below is preferable.

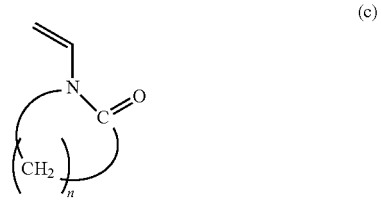

(c)

In Formula (c), n denotes an integer of 2 to 6, and n is preferably an integer of 3 to 5 from the viewpoint of flexibility after the ink composition is cured, adhesion to a support, and availability of starting materials, more preferably 3 or 5, and particularly preferably 5, which is N-vinylcaprolactam. N-vinylcaprolactam is preferable since it has excellent safety, is commonly used and available at a relatively low price, and gives particularly good ink curability and adhesion of a cured coating to a support.

The N-vinyllactam may have a substituent such as an alkyl group or an aryl group on the lactam ring, and may have a saturated or unsaturated ring structure bonded thereto.

With regard to the compound represented by Formula (c), one type thereof may be used on its own or two or more types thereof may be used in combination.

In the present invention, the ink composition may comprise a polymerizable compound other than (Component C-1) a monofunctional radically polymerizable compound.

<Polymerizable Compound Other than Monofunctional Radically Polymerizable Compound>

The ink composition of the present invention comprises a radically polymerizable compound as an essential requirement, and preferably comprises Component C-1 and a polymerizable compound other than Component C-1 as necessary. Examples of a polymerizable compound other than Component C-1 include a polyfunctional radically polymerizable compound having two or more radically polymerizable ethylenically unsaturated bonds.

Specific examples of the polyfunctional polymerizable compound other than Component C-1 include (meth)acrylate compounds such as bis(4-(meth)acryloxypolyethoxyphenyl) propane, tripropylene glycol di(meth)acrylate, polyethylene glycol di(meth)acrylate, polypropylene glycol di(meth)acrylate, dipentaerythritol tetra(meth)acrylate, PO modified trimethylolpropane tri(meth)acrylate, oligoester(meth)acrylate, neopentylglycol di(meth)acrylate hydroxypivalate, tetramethylolmethane tri(meth)acrylate, dimethyloltricyclodecane di(meth)acrylate, modified glycerine tri(meth)acrylate, bisphenol A diglycigyl ether(meth)acrylic acid adduct, modified bisphenol A di(meth)acrylate, bisphenol A propylene oxide modified di(meth)acrylate, bisphenol A ethylene oxide modified di(meth)acrylate, dipentaerythritol hexa(meth) acrylate, propylene glycol digrycigyl ether(meth)acrylic acid adduct, and ditrimethylolpropane tetra(meth)acrylate; and allyl compounds such as diallyl phthalate, and triallyl trimellitate. PO denotes propylene oxide, and EO denotes ethylene oxide.

Preferable examples of polyfunctional radically polymerizable compounds include a polyfunctional vinyl ether.

Specific examples of polyfunctional vinyl ethers include divinyl ethers such as ethylene glycol divinyl ether, diethylene glycol divinyl ether, triethylene glycol divinyl ether, polyethylene glycol divinyl ether, propylene glycol divinyl ether, dipropylene glycol divinyl ether, butylene glycol divinyl ether, butanediol divinyl ether, hexanediol divinyl ether, cyclohexanediol divinyl ether, bisphenol A alkylene oxide divinyl ether, and bisphenol F alkylene oxide divinyl ether; and polyfunctional vinyl ethers such as trimethylolethane trivinyl ether, trimethylolpropane trivinyl ether, ditrimethylolpropane tetravinyl ether, glycerol trivinyl ether, pentaerythritol tetravinyl ether, dipentaerythritol pentavinyl ether, dipentaerythritol hexavinyl ether, an ethylene oxide adduct of trimethylolpropane trivinyl ether, a propylene oxide adduct of trimethylolpropane trivinyl ether, an ethylene oxide adduct of ditrimethylolpropane tetravinyl ether, a propylene oxide adduct of ditrimethylolpropane tetravinyl ether, an ethylene oxide adduct of pentaerythritol tetravinyl ether, a propylene oxide adduct of pentaerythritol tetravinyl ether, an ethylene oxide adduct of dipentaerythritol hexavinyl ether, and a propylene oxide adduct of dipentaerythritol hexavinyl ether. Among these polyfunctional vinyl ethers, a divinyl ether compound is particularly preferable.

Furthermore, as the polyfunctional radically polymerizable compound, for example, photocuring type polymerizable compounds used in photopolymerizable compositions described in publications such as JP-A-7-159983, JP-B-7-31399 (JP-B denotes a Japanese examined patent application publication), JP-A-8-224982, JP-A-10-863, JP-A-9-134011, and published Japanese translation 2004-514014 of a PCT application are known, and these compounds may also be applied the present invention.

The content of a polymerizable compound other than Component C-1 is preferably 0.1 to 15 wt % relative to the total weight of Component C, more preferably 0.5 to 9 wt %.

Component C preferably comprises at least a (meth)acrylamide compound as the monofunctional radically polymerizable compound, and more preferably comprises a monofunctional(meth)acrylamide compound and a monofunctional(meth)acrylate compound. When it is as in the above-mentioned embodiment, the substrate adhesion is better.

The monofunctional(meth)acrylamide compound is preferably an N,N-dialkyl(meth)acrylamide, and more preferably N,N-dimethyl (meth)acrylamide. The number of carbons of the N-alkyl groups in the N,N-dialkyl(meth)acrylamide is preferably 1 to 8.

Furthermore, Component C preferably comprises three or more types of monofunctional(meth)acrylate compounds, and more preferably comprises three to six types of monofunctional(meth)acrylate compounds.

The monofunctional(meth)acrylate compound is preferably a compound selected from the group consisting of isobornyl(meth)acrylate, 2-(2-ethoxyethoxy)ethyl(meth)acrylate, and 2-phenoxyethyl(meth)acrylate.

Moreover, Component C preferably comprises three or more types of compounds selected from the group consisting of isobornyl(meth)acrylate, 2-(2-ethoxyethoxy)ethyl(meth)acrylate, and 2-phenoxyethyl(meth)acrylate, and particularly preferably comprises isobornyl acrylate, 2-(2-ethoxyethoxy)ethyl acrylate, and 2-phenoxyethyl acrylate. When it is as in the above-mentioned embodiment, the substrate adhesion is better.

Component C preferably comprises a difunctional radically polymerizable compound, more preferably comprises at least a divinyl ether compound as the difunctional radically polymerizable compound, and yet more preferably comprises a divinyl ether compound and a difunctional(meth)acrylate compound. When it is as in the above-mentioned embodiment, the substrate adhesion is better.

The divinyl ether compound is preferably a polyalkylene glycol divinyl ether, and more preferably a triethylene glycol divinyl ether.

The difunctional(meth)acrylate compound is preferably an alkanediol di(meth)acrylate, and more preferably a straight chain alkanediol di(meth)acrylate. The number of carbons of the alkanediol of the alkanediol di(meth)acrylate is preferably 4 to 18, and more preferably 6 to 12.

(Component D) Colorant

The ink composition of the present invention preferably further comprises (Component D) Colorant. By adding a colorant to the ink composition of the present invention, the ink composition of the present invention can form a visible image (a color image).

The colorant that can be used here is not particularly limited, and various types of known coloring materials (pigments, dyes) may be selected as appropriate according to the intended application. For example, when forming an image having excellent weather resistance, a pigment is preferable. As a dye, either a water-soluble dye or an oil-soluble dye may be used, and an oil-soluble dye is preferable.

—Pigment—

Pigments that are preferably used in the present invention are described. A color image formed by an ink composition comprising a pigment as a colorant has excellent weather resistance.

The pigment is not particularly limited, and it is possible to use any generally commercially available organic pigment or inorganic pigment, a dispersion of a pigment in an insoluble resin, etc. as a dispersion medium, a pigment on the surface of which a resin has been grafted, etc. It is also possible to use resin particles colored with a dye, etc.

Examples of these pigments include pigments described in 'Ganryo no Jiten' (Dictionary of Pigments) Ed. by Seijirou Ito (2000), W. Herbst, K. Hunger 'Industrial Organic Pigments', JP-A-2002-12607, JP-A-2002-188025, JP-A-2003-26978, and JP-A-2003-342503.

Specific examples of the organic pigment and the inorganic pigment that can be used in the present invention include, as those exhibiting a yellow color, monoazo pigments such as CI Pigment Yellow 1 (Fast Yellow G, etc.) and CI Pigment Yellow 74, disazo pigments such as CI Pigment Yellow 12 (Disazo Yellow AAA, etc.) and CI Pigment Yellow 17, benzidine-free azo pigments such as CI Pigment Yellow 180, azo lake pigments such as CI Pigment Yellow 100 (Tartrazine Yellow Lake, etc.), condensed azo pigments such as CI Pigment Yellow 95 (Azo Condensation Yellow GR, etc.), acidic dye lake pigments such as CI Pigment Yellow 115 (Quinoline Yellow Lake, etc.), basic dye lake pigments such as CI Pigment Yellow 18 (Thioflavine Lake, etc.), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139), nitroso pigments such as CI Pigment Yellow 153 (Nickel Nitroso Yellow, etc.), and metal complex azomethine pigments such as CI Pigment Yellow 117 (Copper Azomethine Yellow, etc.).

Examples of pigments exhibiting a red or magenta color include monoazo pigments such as CI Pigment Red 3 (Toluidine Red, etc.), disazo pigments such as CI Pigment Red 38 (Pyrazolone Red B, etc.), azo lake pigments such as CI Pigment Red 53:1 (Lake Red C, etc.) and CI Pigment Red 57:1 (Brilliant Carmine 6B), condensed azo pigments such as CI Pigment Red 144 (Azo Condensation Red BR, etc.), acidic dye lake pigments such as CI Pigment Red 174 (Phloxine B Lake, etc.), basic dye lake pigments such as CI Pigment Red 81 (Rhodamine 6G' Lake, etc.), anthraquinone pigments such as CI Pigment Red 177 (Dianthraquinonyl Red, etc.), thioindigo pigments such as CI Pigment Red 88 (Thioindigo Bordeaux, etc.), perinone pigments such as CI Pigment Red 194 (Perinone Red, etc.), perylene pigments such as CI Pigment Red 149 (Perylene Scarlet, etc.), quinacridone pigments such as CI Pigment violet 19 (unsubstituted quinachridone) and CI Pigment Red 122 (Quinacridone Magenta, etc.), isoindolinone pigments such as CI Pigment Red 180 (Isoindolinone Red 2BLT, etc.), and alizarin lake pigments such as CI Pigment Red 83 (Madder Lake, etc.).

Examples of pigments exhibiting a blue or cyan color include disazo pigments such as CI Pigment Blue 25 (Dianisidine Blue, etc.), phthalocyanine pigments such as CI Pigment Blue 15 (Phthalocyanine Blue, etc.) and CI Pigment Blue 15:3, acidic dye lake pigments such as CI Pigment Blue 24 (Peacock Blue Lake, etc.), basic dye lake pigments such as CI Pigment Blue 1 (Victoria Pure Blue BO Lake, etc.), anthraquinone pigments such as CI Pigment Blue 60 (Indanthrone Blue, etc.), and alkali blue pigments such as CI Pigment Blue 18 (Alkali Blue V-5:1).

Examples of pigments exhibiting a green color include phthalocyanine pigments such as CI Pigment Green 7 (Phthalocyanine Green) and CI Pigment Green 36 (Phthalocyanine Green), and azo metal complex pigments such as CI Pigment Green 8 (Nitroso Green).

Examples of pigments exhibiting an orange color include isoindoline pigments such as CI Pigment Orange 66 (Isoindoline Orange) and anthraquinone pigments such as CI Pigment Orange 51 (Dichloropyranthrone Orange).

Examples of pigments exhibiting a black color include Pigment Black 7 (carbon black), titanium black, and aniline black.

Specific examples of white pigments that can be used include basic lead carbonate ($2PbCO_3Pb(OH)_2$, also known as silver white), zinc oxide (ZnO, also known as zinc white), titanium oxide ($TiO_2$, also known as titanium white), and strontium titanate ($SrTiO_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) as necessary.

For dispersion of the pigment, for example, a dispersing machine such as a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, or a wet type jet mill may be used.

When carrying out dispersion of the pigment, a dispersant may be added. Examples of the dispersant include hydroxyl group-containing carboxylic acid esters, salts of a long-chain polyaminoamide and a high molecular weight acid ester, high molecular weight polycarboxylic acid salts, high molecular weight unsaturated acid esters, high molecular weight copolymers, modified polyacrylates, aliphatic polycarboxylic acids, naphthalenesulfonic acid formaldehyde condensates, polyoxyethylene alkylphosphate esters, and pigment derivatives. It is also preferable to use a commercial polymeric dispersant such as the Solsperse series manufactured by Lubrizol Corporation.

Furthermore, as a dispersion adjuvant, it is also possible to use a synergist, depending on the various types of pigment. The dispersant and dispersion adjuvant are preferably used at 1 to 50 parts by weight relative to 100 parts by weight of the pigment.

In the ink composition, as a dispersing medium for various components such as the pigment, a solvent may be added, or the polymerizable compound, which is a low molecular weight compound, may be used as a dispersing medium without using a solvent, and since the ink composition of the present invention is a radiation curing type ink, and after the ink is applied on top of a recording medium it is cured, it is preferable not to use a solvent.

It is preferable for the volume average particle size of the pigment to be in the range of 0.02 to 0.60 μm, and more preferably 0.02 to 0.10 μm. In order to make the maximum particle size be no greater than 3 μm, and preferably no greater than 1 μm, it is preferable for the colorant, the dispersant, and the dispersion medium to be selected, and dispersion conditions and filtration conditions to be set. By such control of particle size, clogging of a head nozzle can be suppressed, and the storage stability of ink, the ink transparency, and the curing sensitivity can be maintained. The volume average particle size may be measured using laser diffraction/scattering type particle size distribution measurement equipment (LA-920, Horiba Ltd.), and using tripropylene glycol methyl ether as a solvent.

—Dye—

Next, dyes that are preferably used in the present invention are described.

The dye can be used a compound appropriately selected any generally commercially available compound (dye).

Specific examples of the dye include compounds described in paragraphs 0023 to 0089 of JP-A-2002-114930 and paragraphs 0136 to 0140 of JP-A-2008-13646, and these dyes can be applied to the present invention.

The content of the colorant is preferably 0.05 to 20 wt % relative to the total weight of the ink composition, more preferably 0.2 to 10 wt %. When an oil-soluble dye is used as a colorant, the content of the colorant is particularly preferably 0.2 to 6 wt % relative to the total weight of the ink composition (including a solvent).

<Other Component>

Furthermore, the ink composition of the present invention may comprise a component other than the above-mentioned component. These are explained in turn below.

(Sensitizer)

It is possible to add a sensitizer to the ink composition of the present invention in order to promote decomposition of a polymerization initiator by irradiation with actinic energy ray. The sensitizer absorbs specific actinic radiation to attain an electronically excited state. The sensitizer in an electronically excited state contacts the polymerization initiator to thus cause electron transfer, energy transfer, heat generation, etc., thereby promoting a chemical change of the polymerization initiator, that is, decomposition and formation of a radical, an acid, or a base.

The sensitizer may employ a compound that corresponds to the wavelength of actinic radiation used for generating an initiating species from a photopolymerization initiator used in the ink composition. In consideration of the usage for a general curing reaction of an ink composition, preferred examples of the sensitizer include those that belong to compounds below and have an adsorption wavelength in the region of 350 nm to 450 nm.

Examples of the sensitizer include polynuclear aromatic compounds (e.g. pyrene, perylene, triphenylene), thioxanthones (e.g. isopropylthioxanthone), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin), and a polynuclear aromatic compound and a thioxanthone are preferable.

Moreover, sensitizing dyes described in JP-A-2008-95086 is preferable.

(Cosensitizer)

The ink composition of the present invention preferably comprises a cosensitizer. In the present invention, the cosensitizer has the function of further improving the sensitivity of the sensitizer to actinic radiation or the function of suppressing inhibition by oxygen of polymerization of the polymerizable compound, etc.

Examples of such a cosensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825. Specific examples thereof include triethanolamine, ethyl p-dimethylaminobenzoate, p-formyldimethylaniline, and p-methylthiodimethylaniline.

Other examples of the cosensitizer include thiols and sulfides such as thiol compounds described in JP-A-53-702, JP-B-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the co-sensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), and Si—H, Ge—H compounds described in JP-A-8-54735.

(UV Absorber)

A UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (JP-W denotes an unexamined published international patent application); compounds described in Research Disclosure No. 24239; and compounds represented by stilbene and benzoxazole compounds, which absorb ultraviolet rays to emit fluorescence, the so-called fluorescent brightening agents.

The content of a UV absorber is appropriately selected according to the intended application, and is preferably 0.5 to 15 wt % relative to the total weight of the ink composition.

(Antioxidant)

In order to improve the stability of the ink composition, an antioxidant may be added.

Examples of the antioxidant include those described in Laid-open European Patent Nos. 223739, 309401, 309402, 310551, 310552, and 459416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The content of an antioxidant is appropriately selected according to the intended application, and is preferably 0.1 to 8 wt % relative to the total weight of the ink composition.

(Antifading Agent)

The ink composition of the present invention may employ various organic and metal complex antifading agents.

The organic antifading agents include hydroquinones, alkoxyphenols, dialkoxyphenols, phenols, anilines, amines, indanes, chromans, alkoxyanilines, and heterocycles.

The metal complex antifading agents include nickel complexes and zinc complexes. More specifically, there can be used compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-215272, pages 127 to 137.

The amount thereof added is appropriately selected according to the intended application, and it is generally on the order of 0.1 to 8 wt % on the basis of the solids content in the ink composition.

The content of an antifading agent is appropriately selected according to the intended application, and is preferably 0.1 to 8 wt % relative to the total weight of the ink composition.

(Conductive Salt)

The ink composition of the present invention may contain, for the purpose of controlling discharge properties, a conductive salt such as potassium thiocyanate, lithium nitrate, ammonium thiocyanate, or dimethylamine hydrochloride.

(Solvent)

The ink composition of the present invention may contain a trace amount of organic solvent in order to improve the adhesion to a recording medium.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or the VOC (Volatile Organic Compound), and the amount is preferably in the range of 0.1 to 5 wt % relative to the total amount of the ink composition, and more preferably 0.1 to 3 wt %.

(High Molecular Weight Compound)

The ink composition may contain various types of oil soluble high molecular weight compounds in order to adjust film physical properties.

Examples of the oil soluble high molecular weight compounds include acrylic polymers, polyvinylbutyral resins, polyurethane resins, polyamide resins, polyester resins, epoxy resins, phenol resins, polycarbonate resins, polyvinylformal resins, shellac, vinylic resins, acrylic resins, rubber-based resins, waxes, and other natural resins. They may be used in a combination of two or more types. Among these, a vinylic copolymer obtained by copolymerization of an acrylic monomer is preferable. Furthermore, as a copolymer component of the high molecular weight compound, a copolymer containing as a structural unit a 'carboxyl group-containing monomer', an 'alkyl methacrylate ester', or an 'alkyl acrylate ester' may preferably be used.

When the ink composition is made into a coating, a high molecular weight compound having high surface segregation is preferably used in order to improve tackiness etc. These high molecular weight compounds include polymers having Si or F atom and polymers having long chain alkyl group at a side chain described in paragraphs 0017 to 0037 of JP-A-2008-248119 and paragraphs 0015 to 0034 of JP-A-2005-250890.

(Surfactant)

The ink composition of the present invention may contain a surfactant.

As the surfactant, those described in JP-A-62-173463 and JP-A-62-183457 can be cited. Examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts.

Instead of the surfactant, an organofluoro compound may be used.

The organofluoro compound is preferably hydrophobic. Examples of the organofluoro compound include fluorine-based surfactants, oil-like fluorine-based compounds (e.g. a fluorine oil), and solid fluorine compounds resin (e.g. tetrafluoroethylene resin), and those described in JP-B-57-9053 (8th to 17th columns) and JP-A-62-135826.

The content of a surfactant is appropriately selected according to the intended application, and is preferably 0.0001 to 1 wt % relative to the total weight of the ink composition, and more preferably 0.001 to 0.1 wt %.

Other than the above, as necessary, for example, a polymerization inhibitor, a leveling additive, a matting agent, a wax for adjusting film physical properties, a tackifier that does not inhibit polymerization and that improves adhesion to a recording medium such as a polyolefin or polyethylene terephthalate (PET), etc. may be contained.

Examples of the polymerization inhibitor include hydroquinone, methoxybenzoquinone, methoxyphenol, phenothiazine, t-butylcatechol, mercaptobenzimidazole, an alkyldithiocarbamate, an alkylphenol, an alkylbisphenol, a salicylate, a thiodipropionic acid ester, a phosphite, and a nitroxide aluminum complex. Specifically, Genorad 16, 18, 20, 21, 22 (Rahn), etc. can be cited. The content of the polymerization inhibitor is not limited, but is preferably 0.01 to 5 wt % relative to the total weight of the ink composition, and more preferably 0.02 to 1 wt %.

Specific examples of the tackifier include high molecular weight tacky polymers described on pp. 5 to 6 of JP-A-2001-49200 (e.g. a copolymer from an ester of (meth)acrylic acid and an alcohol having an alkyl group having 1 to 20 carbons, an ester of (meth)acrylic acid and an alicyclic alcohol having 3 to 14 carbons, and an ester of (meth)acrylic acid and an aromatic alcohol having 6 to 14 carbons), and a low-molecular-weight tackiness-imparting resin having a polymerizable unsaturated bond.

(Inkjet Recording Method, Inkjet Recording Device, and Printed Material)

The ink composition of the present invention is suitably used for inkjet recording.

The inkjet recording method of the present invention is a method for forming an image by discharging the ink composition of the present invention onto a recording medium (support, recording material, etc.) for inkjet recording and curing the ink by irradiating the ink composition so discharged onto the recording medium with actinic radiation.

More specifically, the inkjet recording method of the present invention preferably comprises ($a^1$) a step of discharging the inkjet ink composition of the present invention onto a recording medium, and ($b^1$) a step of curing the inkjet ink composition by irradiating the discharged inkjet ink composition with actinic radiation.

Due to the inkjet recording method of the present invention comprising steps ($a^1$) and ($b^1$) above, an image is formed by the ink composition cured on a recording medium.

Furthermore, the printed material of the present invention is a printed material recorded by the inkjet recording method of the present invention.

In the step (a) in the inkjet recording method of the present invention, an inkjet recording device described in detail below may be used.

Inkjet Recording Device

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink composition onto a recording medium (support) in step ($a^1$) of the inkjet recording method of the present invention.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink composition supply tank immediately before an inkjet head, a filter, and a piezo system inkjet head. The piezo system inkjet head may be driven so as to discharge a multi-size dot of preferably 1 to 100 pL, more preferably 3 to 42 pL, and yet more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, with respect to the radiation curing ink composition such as the ink composition of the present invention, since it is desirable for the ink composition to be discharged at a constant temperature, a section from the ink composition supply tank to the inkjet head is thermally insulated and heated. A method of controlling temperature is not particularly limited, but it is preferable to provide, for example, temperature sensors at a plurality of pipe section positions, and control heating according to the ink composition flow rate and the temperature of the surroundings. The temperature sensors may be provided on the ink composition supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition or the inkjet recording ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition having an ink viscosity at 25° C. of no more than 50 mPa·s since good discharge stability can be obtained. By employing this method, high discharge stability can be realized.

The viscosity of the ink composition is a viscosity measured by VISCOMETER TV-22 (TOKI SANGYO Co., Ltd.) at 25° C.

The radiation curing type ink composition such as the ink composition of the present invention generally has a viscosity that is higher than that of a normal ink composition or a water-based ink composition used for an inkjet recording ink composition, and variation in viscosity due to a change in temperature at the time of discharge is large. Viscosity variation in the ink composition has a large effect on changes in liquid droplet size and changes in liquid droplet discharge speed and, consequently, causes the image quality to be degraded. It is therefore necessary to maintain the ink composition discharge temperature as constant as possible. In the present invention, the control range for the temperature of ink composition is preferably ±5° C. of a set temperature, more preferably ±2° C. of the set temperature, and yet more preferably ±1° C. of the set temperature.

The inkjet head used in the inkjet recording method of the present invention is preferably an inkjet head having a nozzle plate with a face on the ink discharge side treated so as to have affinity for an ink.

As the inkjet head having a nozzle plate with a face on the ink discharge side treated so as to have affinity for an ink, for example, an on-demand inkjet head of a piezo drive system manufactured by FUJIFILM Dimatix, Inc. can be cited. Specific examples thereof include S-class and Q-class Sapphire.

The nozzle plate is a nozzle plate with a face on the ink discharge side treated so as to have affinity for an ink, may be one in which at least part of the face on the ink discharge side has been treated so as to have affinity for an ink, and is preferably one in which the entire face on the ink discharge side has been treated so as to have affinity for an ink.

As a method for ink affinity treatment, there can be cited a method in which at least one non-ink repelling layer is formed on at least part of the surface of a nozzle plate.

Specifically, the nozzle plate preferably comprises, on at least part of the face on the ink discharge side, a layer formed from at least one type selected from diamond-like carbon, a metal, a semimetal oxide, a metal oxide, a semimetal nitride, and a metal nitride. The semimetal referred to here includes metalloids such as silicon, germanium, arsenic, antimony, and bismuth, and among them silicon is preferable. As the metal, gold, stainless steel, iron, titanium, tantalum, platinum, rhodium, nickel, chromium, etc. are preferable, and gold and iron are more preferable. As the semimetal oxide, silicon oxide is preferable. As the metal oxide, aluminum oxide is preferable. As the semimetal nitride, silicon nitride is preferable. As the metal nitride, aluminum nitride is preferable.

In the present invention, the nozzle plate preferably comprises, on at least part of the face on the ink discharge side, a layer formed from at least one type selected from the group consisting of gold, stainless steel, iron, titanium, tantalum, platinum, rhodium, nickel, chromium, silicon oxide, silicon nitride, and aluminum nitride, more preferably a layer formed from at least one type selected from the group consisting of gold, stainless steel, iron, titanium, silicon oxide, silicon nitride, and aluminum nitride, yet more preferably a layer formed from at least one type selected from the group consisting of gold, stainless steel, and silicon oxide, and most preferably a layer formed from silicon oxide.

As the method for ink affinity treatment, a known method may be used, and examples thereof include, but are not limited to, (1) a method in which a silicon oxide film is formed by thermally oxidizing the surface of a nozzle plate made of silicon, (2) a method in which an oxide film of silicon or a material other than silicon is oxidatively formed or a method in which it is formed by sputtering, and (3) a method in which a metal film is formed. Details of these methods may be referred to in US Pat. Application No. 2010/0141709.

The curing step ($b^1$) of irradiating the image thus obtained with actinic radiation so as to cure the inkjet ink composition and obtain a printed material having the image cured on the support are explained.

The ink composition discharged onto the recording medium cures upon exposure to actinic radiation. This is due to a initiating species such as a radical being generated by decomposition of the photopolymerization initiator contained in the ink composition of the present invention by irradiation with actinic radiation, the initiating species functioning so as to make a polymerization reaction of a radically polymerizable compound take place and to promote it. In this process, if a sensitizer is present together with the polymerization initiator in the ink composition, the sensitizer in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizing dye, the peak wavelength of the actinic radiation is preferably 200 to 600 nm, more preferably 320 to 420 nm, and particularly preferably 340 to 400 nm.

Furthermore, in the present invention, the photopolymerization initiation system has sufficient sensitivity for low output actinic radiation. The actinic radiation is applied therefore so that the illumination intensity on the exposed surface is preferably 10 to 4,000 mW/cm$^2$, and more preferably 20 to 2,500 mW/cm$^2$.

As an actinic radiation source, a mercury lamp, a gas/solid laser, etc. are mainly used, and for UV photocuring inkjet ink a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, the example of the LED includes a LED, disclosed in U.S. Pat. No. 6,084,250, that can emit actinic radiation whose wavelength is centered between 300 nm and 370 nm. Furthermore, another violet LED is available, and irradiation can be carried out with radiation of a different UV bandwidth. The actinic radiation source preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mW/cm$^2$.

The ink composition of the present invention is desirably exposed to such actinic radiation for preferably 0.01 to 120 sec., and more preferably 0.01 to 90 sec.

Irradiation conditions and a basic method for irradiation with actinic radiation are disclosed in JP-A-60-132767. Specifically, a light source is provided on either side of a head unit that includes an ink composition discharge device, and the head unit and the light source are made to scan by a so-called shuttle system. Irradiation with actinic radiation is carried out after a certain time (preferably 0.01 to 0.5 sec., more preferably 0.01 to 0.3 sec., and yet more preferably 0.01 to 0.15 sec.) has elapsed from when the ink composition has landed. By controlling the time from ink composition landing to irradiation so as to be a minimum in this way, it becomes possible to prevent the ink composition that has landed on a recording medium from spreading before being cured. Furthermore, since the ink composition can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing such a inkjet recording method as described above, it is possible to maintain a uniform dot diameter for landed ink composition even for various types of recording medium (support) having different surface wettability, thereby improving the image quality. In order to obtain a color image, it is preferable to superimpose colors in order from those with a high lightness. By superimposing ink compositions in order from one with high lightness, it is easy for radiation to reach a lower ink composition, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

In this way the ink composition of the present invention may be cured by irradiation with actinic radiation in high sensitivity and form an image on the surface of the recording medium.

The inkjet recording method of the present invention may suitably employ the ink set comprising at least one ink composition of the present invention. The order in which colored ink compositions are discharged is not particularly limited, but it is preferable to apply to a recording medium from a colored ink composition having a high lightness; when the ink compositions of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of seven colors, that is, light cyan, light magenta ink compositions and cyan, magenta, black, white, and yellow dark ink compositions may preferably be used, and in this case they are applied on top of the recording medium in the order white→light cyan→light magenta→yellow→cyan→magenta→black.

In the present invention, the recording medium is not particularly limited, and a recording medium known as a support and a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

In accordance with the present invention, there can be provided an inkjet ink composition that has excellent discharge stability and gives an ink image film having excellent substrate adhesion and film hardness, and an inkjet recording method employing the inkjet ink composition.

EXAMPLES

The present invention is more specifically explained below by reference to Examples, but the present invention is not limited to the Examples below as long as the spirit and scope thereof are not exceeded. Unless otherwise specified, '%' and 'parts' are on a weight basis.

Among the compounds used in the Examples and Comparative Examples, compounds for which no manufacturer is given were synthesized using a known method or based on a known method.

Pigment Yellow 12 (yellow pigment, Clariant)
C.I. Pigment Red 57:1 (magenta pigment, Clariant)
C.I. Pigment Blue 15:3 (cyan pigment, Clariant)
C.I. Pigment Black 7 (black pigment, Clariant)
MICROLITH WHITE R-A (white pigment, Ciba Japan)
SOLSPERSE 32000 (polymeric dispersant, The Lubrizol Corporation)
PEA (2-phenoxyethyl acrylate, monofunctional radically polymerizable compound, VISCOAT #192, Osaka Organic Chemical Industry Ltd.)
NVC (N-vinylcaprolactam, monofunctional radically polymerizable compound, V-CAP, BASF)
IBOA (isobornyl acrylate, monofunctional radically polymerizable compound, ARONIX M-156, Toagosei Co., Ltd.)
DMAAM (N,N-dimethylacrylamide, monofunctional radically polymerizable compound, DMAA, Kohjin Co., Ltd.)
EOEOEA (2-(2-ethoxyethoxy)ethyl acrylate, monofunctional radically polymerizable compound, SR256, Sartomer Company Inc.)
DVE3 (triethylene glycol divinyl ether, difunctional radically polymerizable compound, Rapi-Cure DVE-3, ISP Europe)
HDDA: hexanediol diacrylate, difunctional radically polymerizable compound, KS-HDDA, Sartomer Company Inc.)
TMP(PO)TA (trimethylolpropane propylene oxide-modified triacrylate, trifunctional radically polymerizable compound, ARONIX M-310, Toagosei Co., Ltd.)
Lucirin TPO (2,4,6-trimethylbenzoyldiphenylphosphine oxide, photopolymerization initiator, BASF)
p-Phenylbenzophenone (photopolymerization initiator, Wako Pure Chemical Industries, Ltd.)
Karenz MTPE1 (pentaerythritol tetrakis(3-mercaptobutyrate), chain transfer agent, polyfunctional thiol compound, Showa Denko K.K.)
Karenz MTNR1 (1,3,5-tris(3-mercaptobutyloxyethyl)-1,3,5-triazine-2,4,6(1H,3H,5H)-trione, chain transfer agent, polyfunctional thiol compound, Showa Denko K.K.)
Byk 307 (surfactant, BYK Chemie)
Genorad 16 (polymerization inhibitor, Rahn)

Polymers A-1 to A-8 synthesized in the Examples are the same as Polymers A-1 to A-8 described above.

(Synthesis of Polymer A-1)

70 g of tetrahydrofuran, 30 g of N-n-butylacrylamide, 1.5 g of Karenz MTPE1, and 0.2 g of V-601 (dimethyl 2,2'-azobis (2-methylpropionate), Wako Pure Chemical Industries, Ltd.) were weighed and charged into a 300 mL 3-necked flask equipped with a condenser, and a reaction was carried out under a flow of nitrogen at 80° C. for 5 hours. Subsequently, 0.2 g of V-601 was added, and a reaction was carried out for a further 4 hours. A sample that had been allowed to cool was poured into hexane, purified by reprecipitation, and vacuum-dried, thus giving about 30 g of Polymer A-1.

(Synthesis of Polymers A-2 to A-4)

Polymers A-2 to A-4 were obtained by substantially the same synthesis as for Polymer A-1 except that the monomers were changed as in Table 1.

(Synthesis of Polymer A-5)

A 300 mL 3-necked flask equipped with a condenser was charged with 100 g of tetrahydrofuran (THF), 32.8 g of N,N-diethylacrylamide, 17.2 g of methyl methacrylate, 0.81 g of 1,1,1-tris(2-bromoisobutyryloxymethyl)ethane, 0.62 g of copper (I) oxide, and 0.99 g of Me$_6$-TREN (tris[2-(dimethylamino)ethyl]amine, Aldrich), degassed several times using a vacuum pump, and heated under a flow of nitrogen to 60° C., and a reaction was carried out for 12 hours. After 2 g of methanesulfonic acid was added, the nitrogen was stopped, the sample was rapidly cooled, 100 g of THF was added, and the sample was poured into a large amount of water to thus carry out purification by reprecipitation, thus giving 31.2 g of Polymer A-5.

(Synthesis of Polymers A-6 to A-8)

Polymers A-6 to A-8 were obtained by substantially the same synthesis as for Polymer A-5 except that the starting materials used were changed as in Table 1.

TABLE 1

| Polymer | Monomer 1 | Monomer 2 | Monomer 3 | Chain transfer agent | Initiator |
|---------|-----------|-----------|-----------|----------------------|-----------|
| A-1 | N-n-Butyl acrylamide | — | — | Karenz MTPE1 | V-601 |
| A-2 | N-Butoxymethyl acrylamide | — | — | Karenz MTNR1 | V-601 |
| A-3 | N,N-Diethyl acrylamide | — | — | Dipentaerythritol hexakis(3-mercaptopropionate) | V-601 |
| A-4 | Acryloyl morpholine | Butyl acrylate | — | Pentaerythritol tetrakis(3-mercaptopropionate) | V-601 |
| A-5 | N,N-Diethyl acrylamide | Methyl methacrylate | — | — | 1,1,1-Tris(2-bromoisobutyloxy methyl)ethane |
| A-6 | N,N-Dimethyl acrylamide | Acryloyl morpholine | Methyl methacrylate | — | Pentaerythritol tetrakis(2-bromo isobutyrate) |
| A-7 | N-Isobutoxymethyl acrylamide | — | — | — | Dipentaerythritol hexakis(2-bromo isobutyrate) |
| A-8 | N-Dodecyl acrylamide | Butyl methacrylate | — | Karenz MTPE1 | 2-Bromomethyl propionate |

(Synthesis of Polymers B-1: a Non-Branched Polymer)

70 g of tetrahydrofuran, 30 g of N-n-butyl acrylamide, and 0.6 g of V-601 were weighed and charged into a 300 mL 3-necked flask equipped with a condenser, and a reaction was carried out under a flow of nitrogen at 80° C. for 5 hours. Subsequently, 0.3 g of V-601 was added, and a reaction was carried out for a further 4 hours. A sample that had been allowed to cool was poured into hexane, purified by reprecipitation, and vacuum-dried, thus giving about 30 g of Polymer B-1.

(Synthesis of Polymer B-2: An Acrylic Polymer)

70 g of 2-butanone, 30 g of methyl methacrylate, 0.4 g of pentaerythritol tetrakis(3-mercaptopropionate), and 0.3 g of V-601 were weighed and charged into a 300 mL 3-necked flask equipped with a condenser, and a reaction was carried out under a flow of nitrogen at 80° C. for 5 hours. Subsequently, 1.2 g of V-601 was added, and a reaction was carried out for a further 4 hours. A sample that had been allowed to cool was poured into hexane, purified by reprecipitation, and vacuum-dried, thus giving about 30 g of Polymer B-2.

(Synthesis of Polymer B-3: a Non-Branched Relatively Low Molecular Weight Polymer)

70 g of tetrahydrofuran, 30 g of N-n-butylacrylamide, and 3.1 g of V-601 were weighed and charged into a 300 mL 3-necked flask equipped with a condenser, and a reaction was carried out under a flow of nitrogen at 80° C. for 5 hours. Subsequently, 1.2 g of V-601 was added, and a reaction was carried out for a further 4 hours. A sample that had been allowed to cool was poured into hexane, purified by reprecipitation, and vacuum-dried, thus giving about 30 g of Polymer B-3.

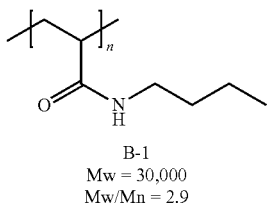

B-1
Mw = 30,000
Mw/Mn = 2.9

-continued

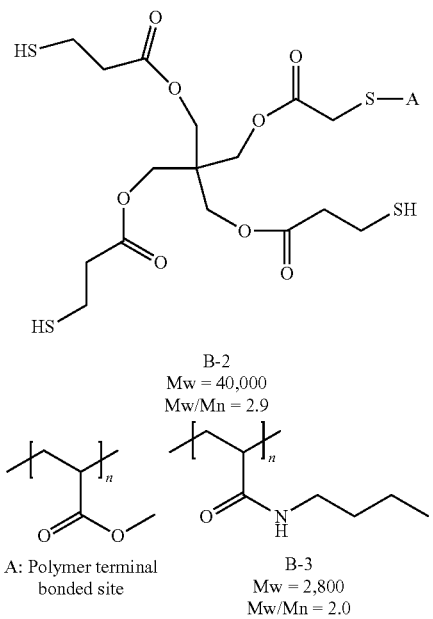

B-2
Mw = 40,000
Mw/Mn = 2.9

A: Polymer terminal bonded site

B-3
Mw = 2,800
Mw/Mn = 2.0

(Preparation of Pigment Dispersion)

A pigment, a dispersant, and a polymerizable compound shown below were mixed and stirred using a mixer (L4R, Silverson) at 2,500 rpm for 10 min. Subsequently, the mixture was placed in a DISPERMAT LS bead mill disperser (VMA) and dispersed using YTZ balls (Nikkato Corporation) having a diameter of 0.65 mm at 2,500 rpm for 6 hours, thus preparing pigment dispersions of each color (Y, M, C, K, and W).

| Yellow pigment dispersion (Y) | |
|---|---|
| Pigment: C.I. Pigment Yellow 12 | 10 parts |
| Dispersant: SOLSPERSE 32000 | 5 parts |
| Monofunctional polymerizable compound: 2-phenoxyethyl acrylate | 85 parts |
| Magenta pigment dispersion (M) | |
| Pigment: C.I. Pigment Red 57:1 | 15 parts |
| Dispersant: SOLSPERSE 32000 | 5 parts |
| Monofunctional polymerizable compound: 2-phenoxyethyl acrylate | 80 parts |
| Cyan pigment dispersion (C) | |
| Pigment: C.I. Pigment Blue 15:3 | 20 parts |
| Dispersant: SOLSPERSE 32000 | 5 parts |
| Monofunctional polymerizable compound: 2-phenoxyethyl acrylate | 75 parts |
| Black pigment dispersion (K) | |
| Pigment: C.I. pigment black 7 | 20 parts |
| Dispersant: SOLSPERSE 32000 | 5 parts |
| Monofunctional polymerizable compound: 2-phenoxyethyl acrylate | 75 parts |
| White pigment dispersion (W) | |
| Pigment: MICROLITH WHITE R-A | 20 parts |
| Dispersant: SOLSPERSE 32000 | 5 parts |
| Monofunctional polymerizable compound: 2-phenoxyethyl acrylate | 75 parts |

Examples 1 to 25 and Comparative Examples 1 to 4

<Preparation of Ink Composition>

The components shown in Table 2 were mixed with the components below, and stirring was carried out using a mixer (L4R, Silverson) at 1,000 rpm for 5 min. Subsequently, filtration was carried out using a cartridge filter (product name: Profile II AB01A01014J) manufactured by Pall Corporation, thus preparing ink compositions of Examples 1 to 25 and Comparative Examples 1 to 4.

| | |
|---|---|
| Polymerization inhibitor: Genorad 16 | 0.05 parts |
| Photopolymerization initiator (Component B): Lucirin TPO | 6.0 parts |
| Photopolymerization initiator (Component B): p-phenylbenzophenone | 4.0 parts |
| Surfactant: Byk 307 | 0.05 parts |

In Table 2, '-' denotes none contained. PEA(*) includes the amount of PEA derived from the pigment dispersion.

The ink compositions of Examples 1 to 25 and Comparative Examples 1 to 4 were subjected to evaluation of substrate adhesion, evaluation of film hardness by a pencil hardness test, and evaluation of discharge stability. The results are shown in Table 2.

—Evaluation of Substrate Adhesion—

A polycarbonate sheet (PC, Teijin Chemicals Ltd.) and an acrylic sheet (Acryl, Japan Acryace Corporation) were used as the recording media, and the surfaces thereof were coated with the ink composition of Examples 1 to 25 and Comparative Examples 1 to 4 obtained above using a K hand coater (Bar No. 2) at a wet film thickness of 12 μm. Subsequently, the ink compositions were cured by actinic radiation using a CSOT (GS Yuasa Power Supply), which is an experimental UV Mini Conveyer, equipped with a MAN250L ozone-free metal halide lamp and set at a conveyor speed of 9.0 m/min and an exposure intensity of 2.0 W/cm$^2$. Adhesion to the recording medium was evaluated using this cured film in accordance with ISO2409 (cross-cut method) with the criteria below. The results are shown in Table 2.

0: the cut edge was completely smooth, and there was no peeling anywhere in any lattice cell.

1: slight peeling of coated film at the intersection point of cuts. The cross-cut portion affected did not exceed 5%.

2: peeled along the edge of a cut and/or the intersection point of cuts in the coated film. The cross-cut portion affected was greater than 5% but did not exceed 15%.

3: large amount of peeling along the edge of cuts of the coated film in parts or in the whole area and/or various parts of the lattice cell were partially or completely peeled. The cross-cut portion affected was greater than 15% but did not exceed 35%.

4: large amount of peeling along the edge of cuts of the coated film in parts or in the whole area and/or lattice cells of several areas were partially or completely peeled. The cross-cut portion affected was greater than 35% but did not exceed 65%.

5: the degree of peeling was beyond 65%.

0 or 1 is an acceptable level.

—Evaluation of Pencil Hardness—

An ink cured film prepared in the same manner as for one used for evaluation of substrate adhesion was subjected to a pencil hardness test in accordance with JIS K5600-4. The results are shown in Table 2.

For the ink composition of the present invention that gives stretchability, the allowable range for hardness is HB or higher, and H or higher is preferable. A printed material having an evaluation result of B or lower is not desirable since there is a possibility of scratches being formed while handling the printed material.

The pencil used was a UNI (registered trademark) manufactured by Mitsubishi Pencil Co., Ltd.

—Evaluation of Discharge Stability—

In order to evaluate ink discharge stability at a head nozzle, the ink was continuously discharged for 60 min from commercially available inkjet recording equipment having piezo type inkjet nozzles under the conditions below, and the number of nozzles lost (number of nozzles that had become blocked) was compared.

The experiment was carried out by counting the number of nozzles lost when discharging the ink compositions of Examples 1 to 25 and Comparative Examples 1 to 4 onto a PET (polyethylene terephthalate) substrate as the recording medium continuously under the conditions below for 60 min, and carrying out exposure (exposure intensity: 1000 mW/cm$^2$).

<Discharge Conditions>
Number of channels: 318/head
Drive frequency: 4.8 kHz/dot
Ink droplets: 7 droplets, 42 pL
Temperature: 45° C.
<Evaluation Criteria>
A: 0 to less than 5 nozzles lost
B: at least 5 but less than 10 nozzles lost
C: at least 10 nozzles lost
  A or B is an acceptable level.

TABLE 2

| | | Pigment dispersion | | Radically polymerizable compound (Component C) | | | | | | | | Component A | | Evaluation | | |
|---|---|---|---|---|---|---|---|---|---|---|---|---|---|---|---|---|
| | | | | Monofunctional polymerizable compound (parts by weight) | | | | | Difunctional polymerizable compound (parts by weight) | | Trifunctional polymerizable compound (parts by weight) | | | Substrate adhesion | Pencil hardness | Discharge stability |
| | | Type | Amount added (parts by weight) | NVC | IBOA | DMAAM | EOEOEA | PEA(*) | DVE3 | HDDA | TMP(PO)TA | Type | Amount added (parts by weight) | PC / Acryl | | |
| Ex. 1 | | Y | 7.0 | 20 | 13 | 10 | 5 | 12 | 1 | 3 | — | A-7 | 2 | 0 / 0 | H | A |
| Ex. 2 | | M | 13.0 | 20 | 13 | 10 | 5 | 12 | 1 | 3 | — | A-7 | 2 | 0 / 0 | H | A |
| Ex. 3 | | C | 7.0 | 20 | 13 | 10 | 5 | 12 | 1 | 3 | — | A-7 | 2 | 0 / 0 | H | A |
| Ex. 4 | | K | 7.0 | 20 | 13 | 10 | 5 | 12 | 1 | 3 | — | A-7 | 2 | 0 / 0 | H | A |
| Ex. 5 | | W | 13.0 | 20 | 13 | 10 | 5 | 12 | 1 | 3 | — | A-7 | 2 | 0 / 0 | H | A |
| Ex. 6 | | K | 7.0 | 20 | 13 | 10 | 5 | 12 | 1 | 3 | — | A-7 | 2 | 0 / 0 | H | A |
| Ex. 7 | | K | 7.0 | 20 | 13 | 10 | 5 | 12 | 1 | 3 | — | A-1 | 2 | 0 / 1 | H | A |
| Ex. 8 | | K | 7.0 | 20 | 13 | 10 | 5 | 12 | 1 | 3 | — | A-2 | 2 | 0 / 1 | H | A |
| Ex. 9 | | K | 7.0 | 20 | 13 | 10 | 5 | 12 | 1 | 3 | — | A-3 | 2 | 0 / 1 | H | A |
| Ex. 10 | | K | 7.0 | 20 | 13 | 10 | 5 | 12 | 1 | 3 | — | A-4 | 2 | 0 / 1 | H | A |
| Ex. 11 | | K | 7.0 | 20 | 13 | 10 | 5 | 12 | 1 | 3 | — | A-5 | 2 | 0 / 0 | H | A |
| Ex. 12 | | K | 7.0 | 20 | 13 | 10 | 5 | 12 | 1 | 3 | — | A-6 | 2 | 0 / 0 | H | A |
| Ex. 13 | | K | 7.0 | 20 | 13 | 10 | 5 | 12 | 1 | 3 | — | A-7 | 2 | 0 / 0 | H | A |
| Ex. 14 | | K | 7.0 | 20 | 13 | 10 | 5 | 12 | 1 | 3 | — | A-8 | 2 | 0 / 0 | H | A |
| Ex. 15 | | K | 7.0 | — | 13 | 21 | 10 | 12 | 1 | 7 | — | A-8 | 2 | 1 / 1 | H | A |
| Ex. 16 | | K | 7.0 | — | 13 | 25 | 10 | 12 | 1 | 3 | — | A-8 | 4 | 0 / 0 | H | A |
| Ex. 17 | | K | 7.0 | — | 13 | 25 | 10 | 12 | 1 | 3 | — | A-8 | 8 | 0 / 0 | H | A |
| Ex. 18 | | K | 7.0 | — | 13 | 25 | 10 | 12 | 1 | 3 | — | A-8 | 12 | 0 / 0 | H | B |
| Ex. 19 | | K | 7.0 | — | 30 | 0 | 13 | 17 | 1 | 3 | — | A-8 | 2 | 1 / 1 | H | A |
| Ex. 20 | | K | 7.0 | — | 13 | 25 | 10 | 16 | 0 | 0 | — | A-8 | 2 | 1 / 1 | HB | A |
| Ex. 21 | | K | 7.0 | — | 0 | 35 | 0 | 25 | 1 | 3 | — | | | | | |
| Ex. 22 | | K | 7.0 | — | 18 | 30 | 0 | 12 | 1 | 3 | — | | | | | |
| Ex. 23 | | K | 7.0 | — | 13 | 21 | 10 | 8 | 1 | 11 | — | | | | | |
| Ex. 24 | | K | 7.0 | — | 13 | 15 | 10 | 8 | 1 | 17 | — | | | | | |
| Ex. 25 | | K | 7.0 | — | 10 | 10 | 5 | 8 | 1 | 26 | 4 | | | | | |
| Comp. Ex. 1 | | K | 7.0 | 20 | 13 | 10 | 5 | 12 | 1 | 3 | — | | | | | |
| Comp. Ex. 2 | | K | 7.0 | 20 | 13 | 10 | 5 | 12 | 1 | 3 | — | | | | | |
| Comp. Ex. 3 | | K | 7.0 | 20 | 13 | 10 | 5 | 12 | 1 | 3 | — | | | | | |
| Comp. Ex. 4 | | K | 7.0 | — | 13 | 25 | 10 | 12 | 1 | 3 | — | | | | | |

Additional columns (Total amount of Component C / Proportion of monofunctional polymerizable compound in Component C):

| | Total amount of Component C (parts by weight) | Proportion of monofunctional polymerizable compound in Component C (wt %) |
|---|---|---|
| Ex. 1 | 64.0 | 93.8 |
| Ex. 2 | 64.0 | 93.8 |
| Ex. 3 | 64.0 | 93.8 |
| Ex. 4 | 64.0 | 93.8 |
| Ex. 5 | 64.0 | 93.8 |
| Ex. 6 | 64.0 | 93.8 |
| Ex. 7 | 64.0 | 93.8 |
| Ex. 8 | 64.0 | 93.8 |
| Ex. 9 | 64.0 | 93.8 |
| Ex. 10 | 64.0 | 93.8 |
| Ex. 11 | 64.0 | 93.8 |
| Ex. 12 | 64.0 | 93.8 |
| Ex. 13 | 64.0 | 93.8 |
| Ex. 14 | 64.0 | 93.8 |
| Ex. 15 | 64.0 | 87.5 |
| Ex. 16 | 64.0 | 93.8 |
| Ex. 17 | 64.0 | 93.8 |
| Ex. 18 | 64.0 | 93.8 |
| Ex. 19 | 64.0 | 93.8 |
| Ex. 20 | 64.0 | 100.0 |

TABLE 2-continued

|  |  |  |  |  |  |  |  |  |  |
|---|---|---|---|---|---|---|---|---|---|
|  |  | 21 | 64.0 | 93.8 | A-8 | 2 | 1 | 0 | H | B |
|  |  | 22 | 64.0 | 93.8 | A-8 | 2 | 1 | 0 | H | A |
|  |  | 23 | 64.0 | 81.3 | A-8 | 2 | 1 | 1 | H | A |
|  |  | 24 | 64.0 | 71.9 | A-8 | 2 | 2 | 1 | H | A |
|  |  | 25 | 64.0 | 51.6 | A-8 | 2 | 2 | 2 | H | B |
| Comp. | 1 | 64.0 | 93.8 | — | 0 | 3 | 4 | B | B |
| Ex. | 2 | 64.0 | 93.8 | B-1 | 2 | 4 | 4 | B | C |
|  | 3 | 64.0 | 93.8 | B-2 | 2 | 4 | 4 | HB | B |
|  | 4 | 64.0 | 93.8 | B-3 | 0 | 5 | 5 | B | B |

What is claimed is:

1. An inkjet ink composition comprising:
(Component A) a dendritic polymer compound having a weight-average molecular weight of 3,000 to 100,000 and having a constituent repeating unit represented by Formula (I);
(Component B) a polymerization initiator; and
(Component C) a radically polymerizable compound,

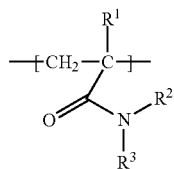

(I)

wherein $R^1$ and $R^2$ independently denote a hydrogen atom or an alkyl group having 1 to 6 carbons, $R^3$ denotes an alkyl group having 1 to 12 carbons, and $R^2$ and $R^3$ may be bonded to form a ring structure.

2. The inkjet ink composition according to claim 1, wherein Component C comprises (Component C-1) a monofunctional radically polymerizable compound.

3. The inkjet ink composition according to claim 2, wherein the content of Component C-1 is at least 80 wt % of the total weight of Component C.

4. The inkjet ink composition according to claim 2, wherein the content of Component C-1 is at least 85 wt % of the total weight of Component C.

5. The inkjet ink composition according to claim 1, wherein Component C comprises a difunctional radically polymerizable compound.

6. The inkjet ink composition according to claim 1, wherein Component A has a weight-average molecular weight of 3,000 to 60,000.

7. The inkjet ink composition according to claim 1, wherein Component A comprises a polyfunctional thiol compound residue.

8. The inkjet ink composition according to claim 1, wherein Component A comprises a tetra- or higher-valent polyfunctional thiol compound residue.

9. The inkjet ink composition according to claim 1, wherein Component A has a molecular weight distribution (weight-average molecular weight (Mw)/number-average molecular weight (Mn)) of no greater than 3.

10. The inkjet ink composition according to claim 1, wherein the inkjet ink composition further comprises (Component D) a colorant.

11. The inkjet ink composition according to claim 1, wherein Component C comprises (Component C-2) an N-vinyl compound.

12. The inkjet ink composition according to claim 11, wherein Component C-2 is N-vinylcaprolactam.

13. The inkjet ink composition according to claim 1, wherein Component A is a copolymer having a constituent repeating unit represented by Formula (I) above and a constituent repeating unit represented by Formula (II),

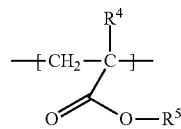

(II)

wherein $R^4$ denotes a hydrogen atom or an alkyl group having 1 to 6 carbons and $R^5$ denotes an optionally substituted alkyl group or an optionally substituted aryl group.

14. The inkjet ink composition according to claim 1, wherein Component A is a copolymer having at least two different types of constituent repeating units represented by Formula (I) above.

15. The inkjet ink composition according to claim 1, wherein Component A is a hyper brunched polymer.

16. The inkjet ink composition according to claim 1, wherein Component A is a hyper brunched polymer having a polymer chain having a constituent repeating unit represented by Formula (I) as a branched structure.

17. An inkjet recording method comprising:
($a^1$) step of discharging the inkjet ink composition according to claim 1 onto a recording medium; and
($b^1$) a step of curing the inkjet ink composition by irradiating the discharged inkjet ink composition with actinic radiation.

* * * * *